US012793550B2

(12) United States Patent
Kim et al.

(10) Patent No.: US 12,793,550 B2
(45) Date of Patent: Nov. 10, 2026

(54) METHOD FOR PERFORMING COLLISION ASSESSMENT BY FIRST DEVICE IN WIRELESS COMMUNICATION SYSTEM, AND DEVICE THEREFOR

(71) Applicant: LG Electronics Inc., Seoul (KR)

(72) Inventors: Heejin Kim, Seoul (KR); Hakseong Kim, Seoul (KR); Hanbyul Seo, Seoul (KR)

(73) Assignee: LG Electronics Inc., Seoul (KR)

(*) Notice: Subject to any disclaimer, the term of this patent is extended or adjusted under 35 U.S.C. 154(b) by 358 days.

(21) Appl. No.: 18/578,598

(22) PCT Filed: Jul. 13, 2022

(86) PCT No.: PCT/KR2022/010216
§ 371 (c)(1),
(2) Date: Jan. 11, 2024

(87) PCT Pub. No.: WO2023/287198
PCT Pub. Date: Jan. 19, 2023

(65) Prior Publication Data

US 2024/0331544 A1 Oct. 3, 2024

(30) Foreign Application Priority Data

Jul. 13, 2021 (KR) ........................ 10-2021-0091699

(51) Int. Cl.
*G08G 1/16* (2006.01)

(52) U.S. Cl.
CPC ............. *G08G 1/166* (2013.01); *G08G 1/162* (2013.01); *G08G 1/167* (2013.01)

(58) Field of Classification Search
CPC .......... G08G 1/16; G08G 1/162; G08G 1/166; G08G 1/167; H04W 4/023; H04W 4/027;
(Continued)

(56) References Cited

U.S. PATENT DOCUMENTS 5,904,730 A * 5/1999 Yamazaki ......... G01M 17/0078 701/45
10,176,524 B1 * 1/2019 Brandmaier ......... G08G 1/0129
(Continued)

FOREIGN PATENT DOCUMENTS

CN 113096411 A 7/2021
KR 10-2021-0043065 4/2021

OTHER PUBLICATIONS

Extended European Search Report in European Appln. No. 22842460.2, mailed on May 19, 2025, 5 pages.
(Continued)

*Primary Examiner* — Michael R Neff
(74) *Attorney, Agent, or Firm* — Fish & Richardson P.C.

(57) ABSTRACT

Disclosed are a method for performing collision assessment for a first terminal by a first device in a wireless communication system, and a device therefor according to various embodiments. Disclosed are a method and a device therefor, the method comprising the steps of receiving capability information from the first terminal; determining one mode among a first mode and a second mode related to performing of the collision assessment, on the basis of the capability information; and transmitting information on the one mode to the first terminal, wherein whether to perform collision assessment for the first terminal is determined on the basis of the one mode.

13 Claims, 17 Drawing Sheets

(58) Field of Classification Search
CPC ........... H04W 4/08; H04W 4/44; H04W 4/46; H04W 4/50; H04W 4/90
USPC ........................................................ 455/456.3
See application file for complete search history.

(56) References Cited

U.S. PATENT DOCUMENTS

| | | | | |
|---|---|---|---|---|
| 10,829,071 | B1 | 11/2020 | Christensen et al. | |
| 11,751,039 | B2 * | 9/2023 | Zhang | H04L 43/16 455/404.1 |
| 2004/0117116 | A1 | 6/2004 | Rao et al. | |
| 2015/0360663 | A1 * | 12/2015 | Svensson | B60T 13/745 701/70 |
| 2018/0208195 | A1 | 7/2018 | Hutcheson et al. | |
| 2019/0050718 | A1 * | 2/2019 | Tickoo | G01C 21/28 |
| 2019/0265714 | A1 * | 8/2019 | Ball | G05D 1/024 |
| 2020/0398830 | A1 * | 12/2020 | Lee | B60W 10/18 |

OTHER PUBLICATIONS

Tao et al., "Collision Risk Assessment Service for Connected Vehicles: Leveraging Vehicular State and Motion Uncertainties," IEEE Internet of Things Journal, Jul. 2021, 8(14):11548-11560.

International Search Report and Written Opinion in International Appln. No. PCT/KR2022/010216, mailed on Oct. 19, 2022, 11 pages (with English translation).

Robert Bosch GmbH, "Further Discussion on Power Saving for Sidelink," R1-2105866, 3GPP TSG RAN WG1 Meeting #105, E-Meeting, May 10-27, 2021, 9 pages.

* cited by examiner (a)

(b)

(a) (b)

METHOD FOR PERFORMING COLLISION ASSESSMENT BY FIRST DEVICE IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2022/010216, filed on Jul. 13, 2022, which claims the benefit of Korean Application No. 10-2021-0091699, filed on Jul. 13, 2021. The disclosures of the prior applications are incorporated by reference in their entirety.

TECHNICAL FIELD

The present disclosure relates to a method of performing, by a first device, operations related to collision assessment for a first user equipment (UE) in a wireless communication system and device therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

The present disclosure aims to provide a method and device for minimizing the processing overload of a server caused by collision assessment for each of a plurality of user equipment (UE) pairs by determining an entity responsible for performing the collision assessment and allocating part of the processing load related to the collision assessment to some UEs based on capability information related to the collision assessment from a UE.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

In an aspect of the present disclosure, provided herein is a method of performing, by a first device, collision assessment for a first user equipment (UE) in a wireless communication system. The method may include: receiving capability information from the first UE; determining one mode from among a first mode and a second mode based on the capability information; and transmitting information on the one mode to the first UE. Whether to perform the collision assessment for the first UE may be determined based on the one mode.

Alternatively, the collision assessment for the first UE may be performed based on that the one mode is determined as the first mode. The collision assessment for the first UE may not be performed based on that the one mode is determined as the second mode.

Alternatively, the capability information may include information on at least one of a battery status, a processing capacity, a driving condition, a road type, and a UE mode of the first UE.

Alternatively, when the processing capacity or the battery status is lower than a predetermined threshold level or when the road type is not a predetermined road type, the first device may determine the first mode and performs the collision assessment for the first UE.

Alternatively, the method may further include: transmitting UE information on a second UE for collision assessment between the first UE and the second UE or a collision warning message regarding collision with the second UE based on the one mode.

Alternatively, the first device may transmit the UE information to the first UE based on that the one mode is determined as the second mode. The first device may transmit the collision warning message to the first UE rather than the UE information based on that the one mode is determined as the first mode.

Alternatively, the second UE may be a grouped first UE group or a representative UE of the first UE group.

Alternatively, the first UE group may be grouped based on heading directions, speeds, acceleration values, curvature values, path histories, driving lanes, and driving directions of UEs.

Alternatively, the representative UE may be a UE driving in a lead among UEs included in the first UE group based on a driving direction or a driving lane, a UE closest to the first UE, or a UE with a most similar path history to the first UE.

Alternatively, the method may further include: performing collision assessment between the first UE and a second UE based on that the one mode is determined as the first mode; and determining whether to transmit UE information on the second UE to the first UE in downlink based on the collision assessment.

Alternatively, the method may further include, based on that a processing capacity of the first device reaches a specific limit or that an amount of downlink data needs to be adjusted in collision assessment for each UE pair including two UEs, determining priorities between the UE pairs related to the collision assessment or transmission of the downlink data.

Alternatively, the priorities may be determined based on at least one of a distance between the two UEs, battery statuses of the two UEs, similarity in path histories between the two UEs, heading directions or speeds of the two UEs, or driving conditions of the two UEs.

In another aspect of the present disclosure, there is provided a method of performing, by a first server, operations related to collision assessment for a first UE in a wireless communication system. The method may include: receiving capability information from the first UE in uplink; determining one mode from among a first mode and a second mode based on the capability information; and transmitting information on the one mode to the first UE in a downlink signal. Whether to perform the collision assessment for the first UE may be determined based on the one mode.

In another aspect of the present disclosure, there is provided a method of receiving, by a first UE, a configuration of a mode related to collision assessment in a wireless communication system. The method may include: transmitting capability information to a first server in an uplink signal; receiving a configuration of one mode related to the collision assessment in a downlink signal; and receiving a message related to the collision assessment in downlink based on the one mode. The one mode may be configured from among a first mode and a second mode based on the capability information. Whether to perform the collision assessment may be determined based on the configured mode.

In another aspect of the present disclosure, there is provided a first device configured to perform collision assessment for a first UE in a wireless communication system. The first device may include: a radio frequency (RF) transceiver; and a processor connected to the RF transceiver. The processor may be configured to: control the RF transceiver to receive capability information from the first UE; determine one mode from among a first mode and a second mode based on the capability information; and control the RF transceiver to transmit information on the one mode to the first UE. Whether to perform the collision assessment for the first UE may be determined based on the one mode.

In another aspect of the present disclosure, there is provided a first server configured to perform collision assessment for a first UE in a wireless communication system. The first server may include: an RF transceiver; and a processor connected to the RF transceiver. The processor may be configured to: control the RF transceiver to receive capability information from the first UE in an uplink signal; determine one mode from among a first mode and a second mode based on the capability information; and control the RF transceiver to transmit information on the one mode to the first UE in a downlink signal. Whether to perform the collision assessment for the first UE may be determined based on the one mode.

In another aspect of the present disclosure, there is provided a chipset configured to perform collision assessment for a first UE in a wireless communication system. The chipset may include: at least one processor; and at least one memory operably connected to the at least one processor and configured to, when executed, cause the at least one processor to perform operations. The operations may include: receiving capability information from the first UE; determining one mode from among a first mode and a second mode based on the capability information; and transmitting information on the one mode to the first UE. Whether to perform the collision assessment for the first UE may be determined based on the one mode.

In another aspect of the present disclosure, there is provided a computer-readable storage medium comprising at least one computer program configured to cause at least one processor to perform operations for performing collision assessment for a first UE in a wireless communication system. The computer-readable storage medium may include the at least one computer program. The at least one computer program may be stored on the computer-readable storage medium. The operations may include: receiving capability information from the first UE; determining one mode from among a first mode and a second mode based on the capability information; and transmitting information on the one mode to the first UE. Whether to perform the collision assessment for the first UE may be determined based on the one mode.

In a further aspect of the present disclosure, there is provided a method of processing, by a first device, service information related to services provided to a first UE in a wireless communication system. The method may include: receiving capability information from the first UE; determining one mode from among a first mode and a second mode based on the capability information; and transmitting information on the one mode to the first UE. The first device may perform operations for processing the service information based on that the one mode is determined as the first mode.

Alternatively, the first device may perform collision assessment between the first UE and another UE by processing the service information or perform operations for adjusting movement paths of the first UE and the other UE.

According to various embodiments, the processing overload of a server caused by collision assessment for each of a plurality of user equipment (UE) pairs may be minimized by determining an entity responsible for performing the collision assessment and allocating part of the processing load related to the collision assessment to some UEs based on capability information related to the collision assessment from a UE.

A server may group a plurality of UEs into UE groups and then perform collision assessment based on the grouped UE groups, thereby minimizing the processing overload of the server caused by the collision assessment.

A server may transmit one group cooperative awareness message (CAM) (or aggregation CAM) for a UE group in downlink, thereby minimizing downlink signaling load.

A server may transmit a collision-related message only to UE pairs whose collision risk according to collision assessment is more than or equal to a predetermined threshold among a plurality of UE pairs, thereby minimizing downlink signaling load.

Alternatively, a server may determine the priority of message transmission based on collision assessment or collision assessment for a plurality of UE pairs and then perform the collision assessment and message transmission based on the priority, thereby adjusting downlink signaling load while preventing overload in the processing capacity overload of the server.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
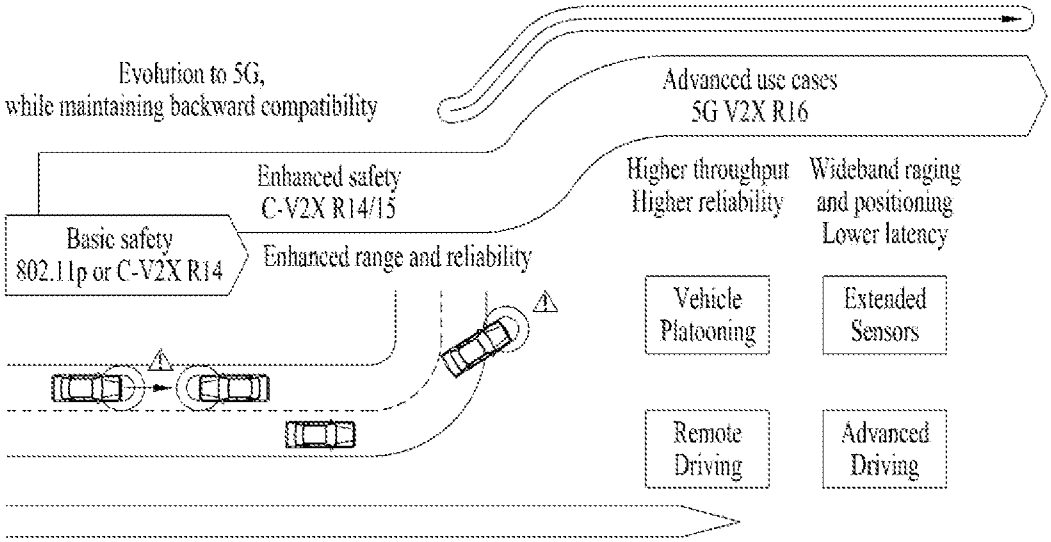
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE).

OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto.

Figure 2:
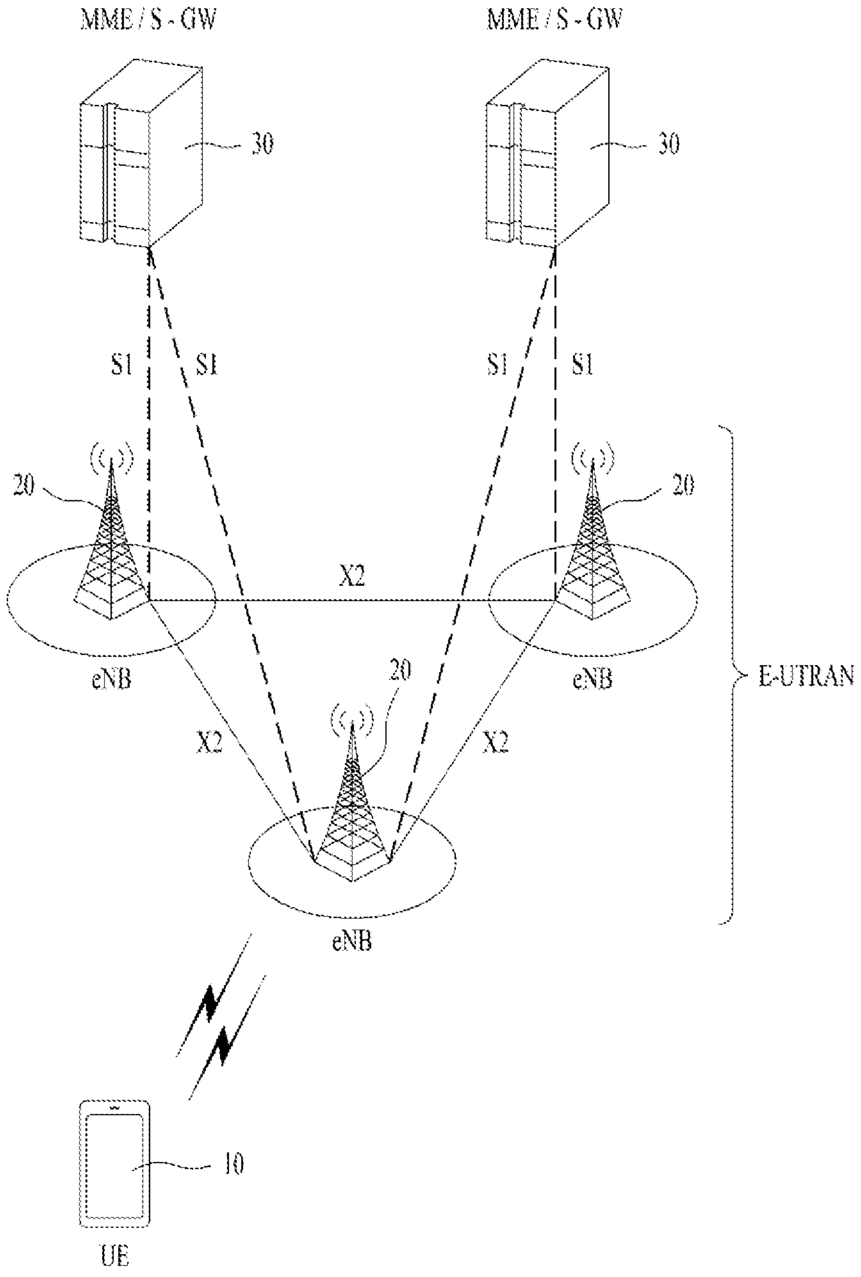
FIG. 2 illustrates the structure of an LTE system to which embodiment(s) are applicable.

FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
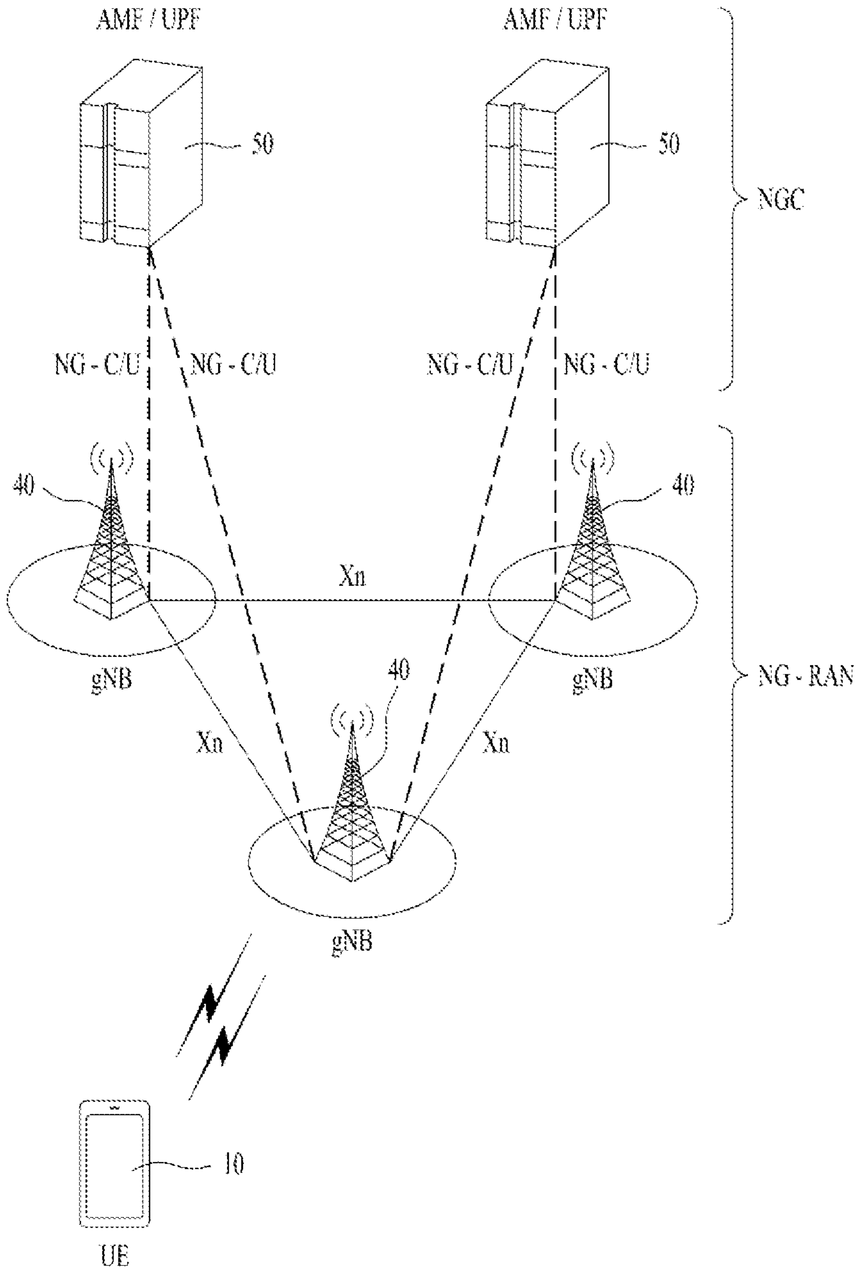
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
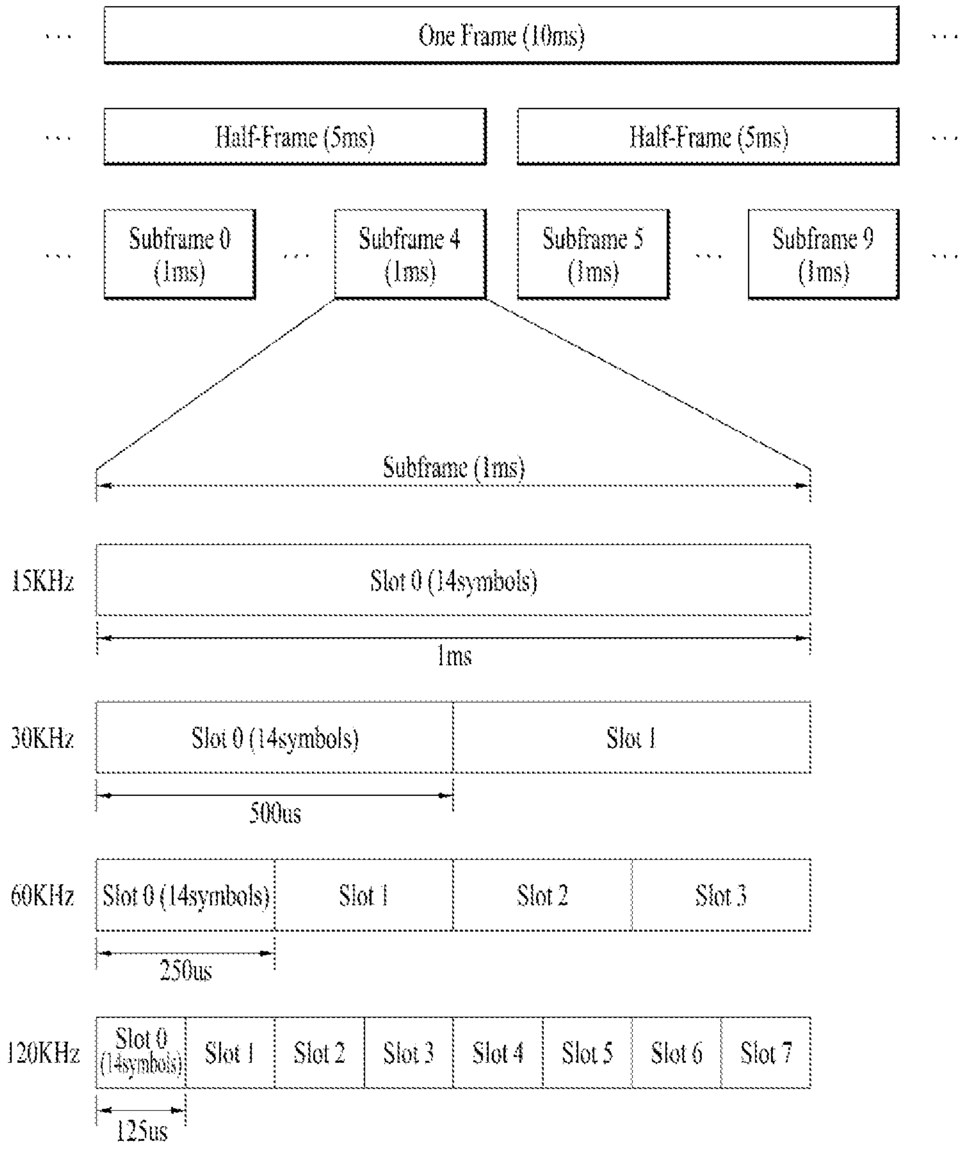
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 kHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
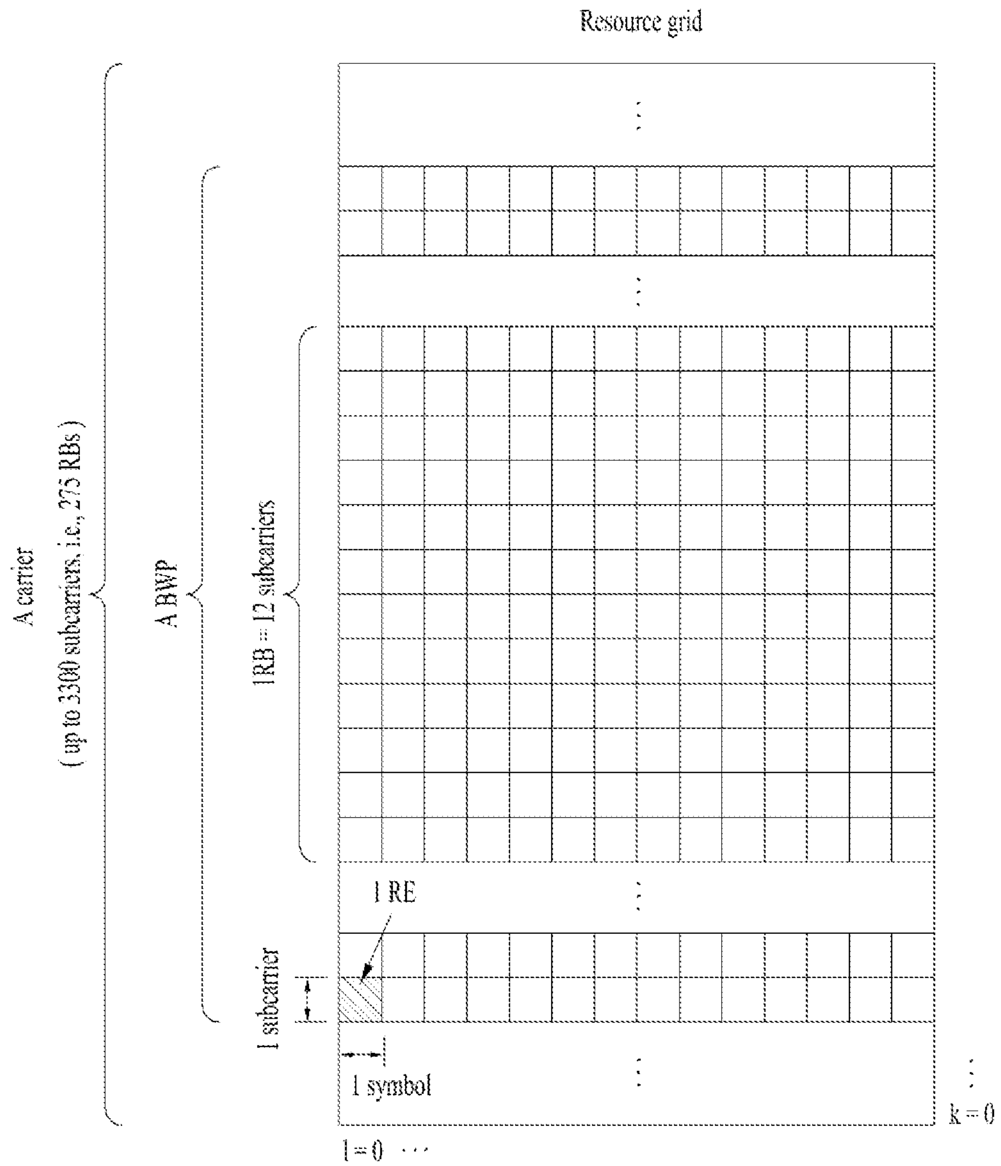
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
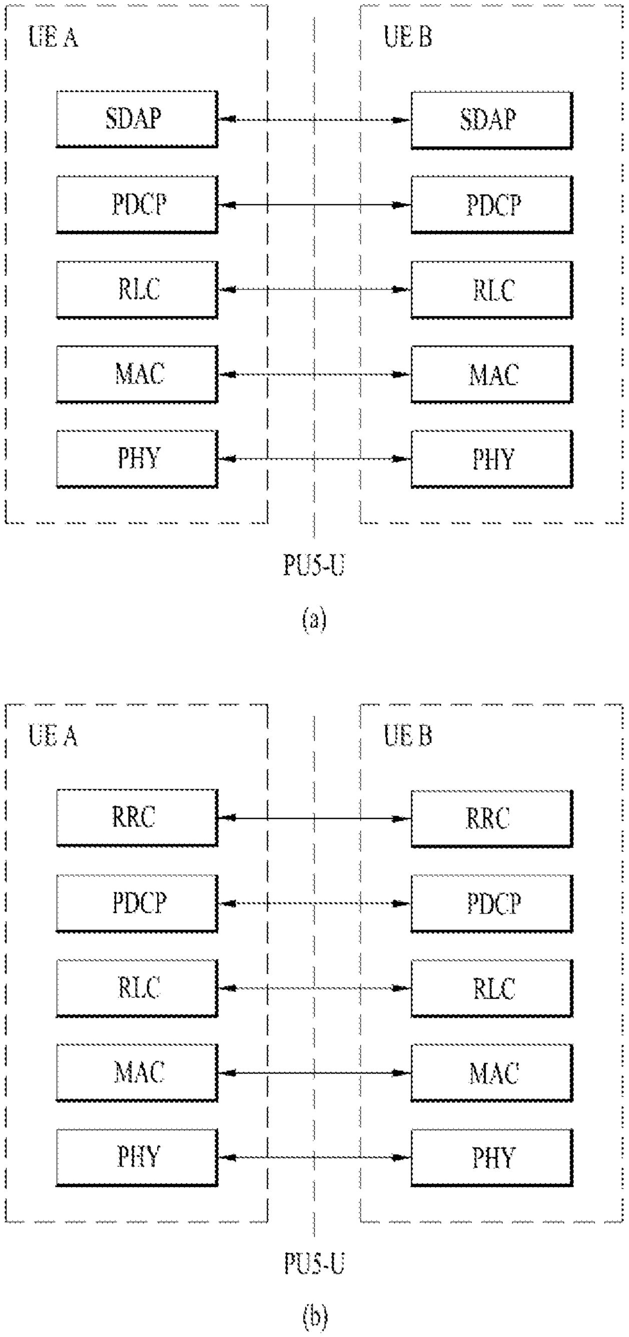
FIG. 6 illustrates a radio protocol architecture for SL communication.

FIG. 6 illustrates a radio protocol architecture for SL communication. Specifically, FIG. 6-(*a*) shows a user plane protocol stack of NR, and FIG. 6-(*b*) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
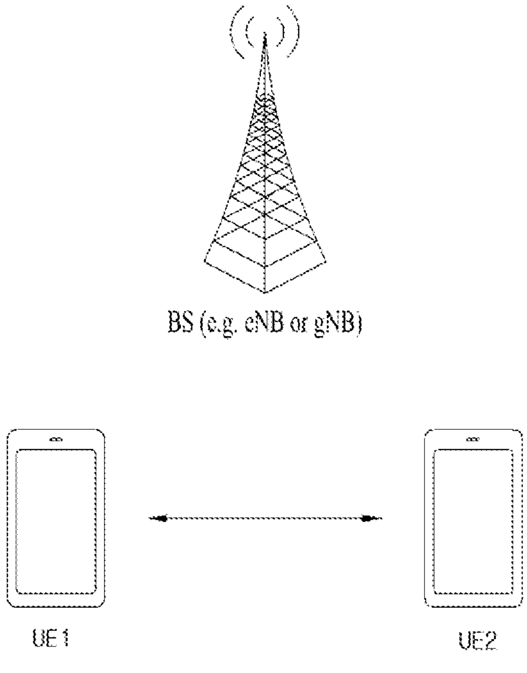
FIG. 7 illustrates UEs performing V2X or SL communication.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
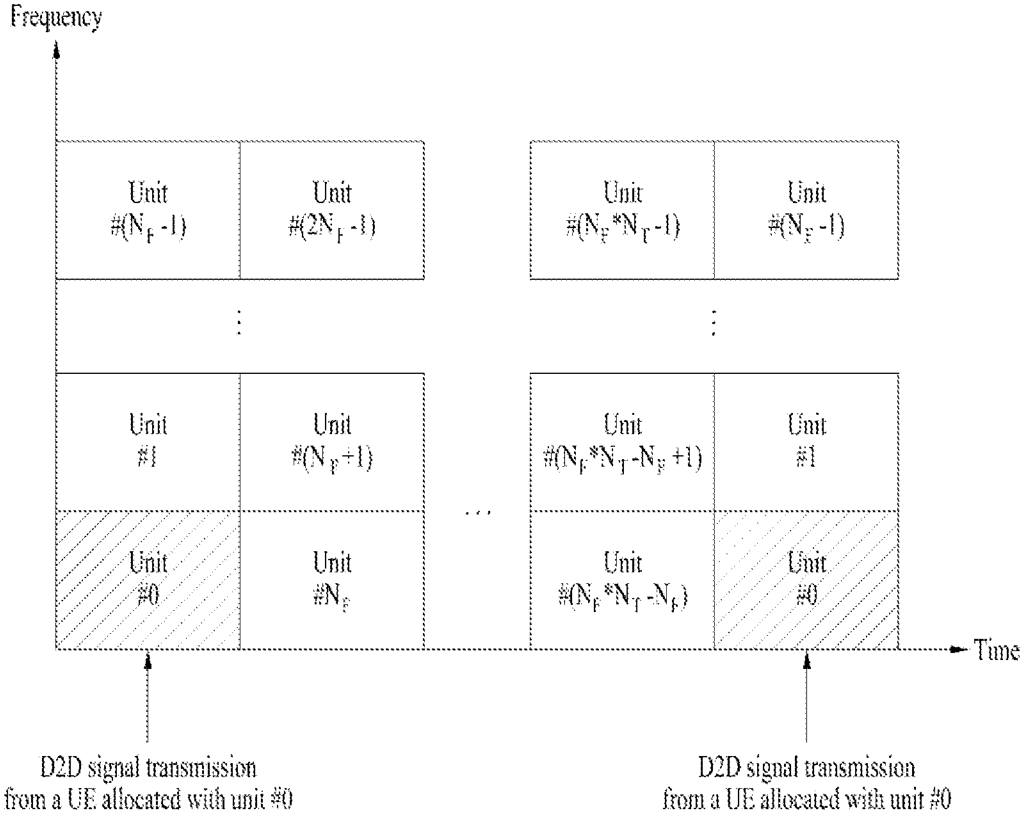
FIG. 8 illustrates resource units for V2X or SL communication.

FIG. 8 illustrates resource units for V2X or SL communication.

Referring to FIG. 8, the frequency resources of a resource pool may be divided into $N_F$ sets, and the time resources of the resource pool may be divided into $N_T$ sets. Accordingly, a total of $N_F*N_T$ resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
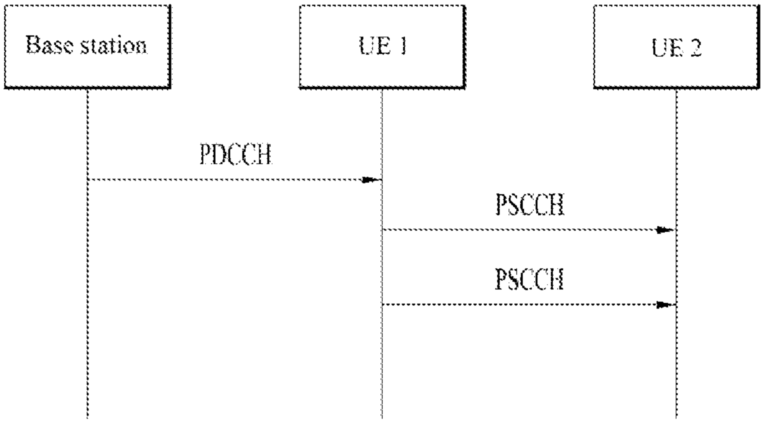
FIG. 9 illustrates a procedure in which UEs perform V2X or SL communication according to a transmission mode.
Figure 9:
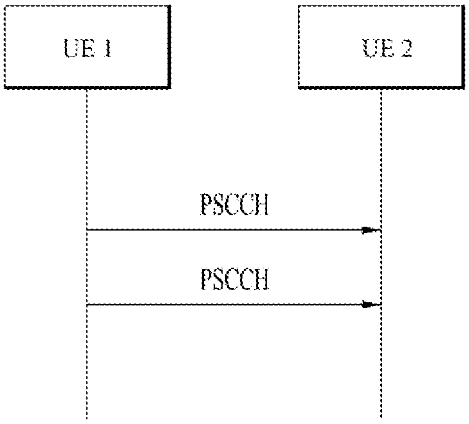

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(*a*) illustrates a UE operation related to LTE transmission mode 1 or LTE transmission mode 3. Alternatively, for example, FIG. 9-(*a*) illustrates a UE operation related to NR resource allocation mode 1. For example, LTE transmission mode 1 may be applied to general SL communication, and LTE transmission mode 3 may be applied to V2X communication.

For example, FIG. 9-(*b*) illustrates a UE operation related to LTE transmission mode 2 or LTE transmission mode 4. Alternatively, for example, FIG. 9-(*b*) illustrates a UE operation related to NR resource allocation mode 2.

Referring to FIG. 9-(*a*), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module.

For example, the X may be dynamically indicated using a field of DCI. For example, the minimum value of X may depend on the UE capability. For example, the UE may report a single value according to the UE capability. For example, X may be a positive number.

Referring to FIG. 9-(*b*), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at $T1 \geq 0$. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Hybrid Automatic Repeat Request (HARQ) is the combination of FEC and ARQ, and can improve performance by checking whether data received by a physical layer contains an error that cannot be decoded, and requesting retransmission if an error occurs.

In case of sidelink unicast and groupcast, HARQ feedback and HARQ combining in a physical layer may be supported. For example, when an Rx UE operates in resource allocation mode 1 or 2, the Rx UE may receive PSSCH from a Tx UE, and the Rx UE may transmit HARQ-ACK feedback on the PSSCH to the Tx UE using a Sidelink Feedback Control Information (SFCI) format through Physical Sidelink Control Channel (PSFCH).

When side link HARQ feedback is enabled for unicast, in case of a non-Code Block Group (non-CBG) operation, when the Rx UE successfully decodes a corresponding transport block, the Rx UE may generate HARQ-ACK. Then, the Rx UE may transmit the HARQ-ACK to the Tx UE. After the Rx UE has decoded an associated PSCCH targeting the Rx UE, if the Rx UE fails to successfully decode the corresponding transport block, the Rx UE may generate HARQ-NACK. Then, the Rx UE may transmit the HARQ-NACK to the Tx UE.

When side link HARQ feedback is enabled for groupcast, a UE may determine whether to send HARQ feedback based on a Tx-Rx distance and/or RSRP. In case of a non-CBG operation, two kinds of options may be supported.

(1) Option 1: When an Rx UE fails to decode a corresponding transport block after decoding an associated PSCCH, the Rx UE may transmit HARQ-NACK on PSFCH. Otherwise, the Rx UE may not transmit a signal on PSFCH.

(2) Option 2: When an Rx UE successfully decodes a corresponding transport block, the Rx UE may transmit HARQ-ACK on PSFCH. When the Rx UE fails to decode the corresponding transport block successfully after decoding an associated PSCCH targeting the Rx UE, the Rx UE may transmit HARQ-NACK on PSFCH.

In case of mode 1 resource allocation, the time between HARQ feedback transmission on PSFCH and PSSCH may be set (in advance). In case of unicast and groupcast, if retransmission in sidelink is required, it may be indicated to a BS by an in-coverage UE that uses PUCCH. A Tx UE may transmit an indication to a serving BS of the Tx UE in a form such as a Scheduling Request/Buffer Status Report (SR/BSR) rather than a form of HARQ ACK/NACK. In addition, even if the BS does not receive the indication, the BS may schedule a side link retransmission resource to the UE.

In case of mode 2 resource allocation, the time between HARQ feedback transmission on PSFCH and PSSCH may be set (in advance).

Hereinafter, sidelink congestion control will be described.

When a UE determines a sidelink Tx resource by itself, the UE also determines a size and frequency of a resource used by the UE. Of course, due to constraints from a network, etc., using a resource size or frequency of a predetermined level or higher may be limited. However, when all UEs use relatively large resources in a situation that many UEs are concentrated in a specific area at a specific timing, overall performance may be considerably due to mutual interference.

Accordingly, a UE needs to observe a channel situation. If it is determined that an excessive amount of resources are being consumed, it is preferable that the UE takes an operation in the form of reducing its own resource use. In the present specification, this may be defined as Congestion Control (CR). For example, a UE may determine whether the energy measured in a unit time/frequency resource is equal to or higher than a predetermined level, and adjust an amount and frequency of its Tx resource according to a ratio of the unit time/frequency resource from which the energy equal to or higher than the predetermined level is observed. In the present specification, the ratio of the time/frequency resources from which the energy equal to or higher than the predetermined level is observed may be defined as a Channel Busy Ratio (CBR). The UE may measure the CBR with respect to a channel/frequency. Additionally, the UE may transmit the measured CBR to a network/BS.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as intelligent transport system (ITS) stations.

Figure 10:
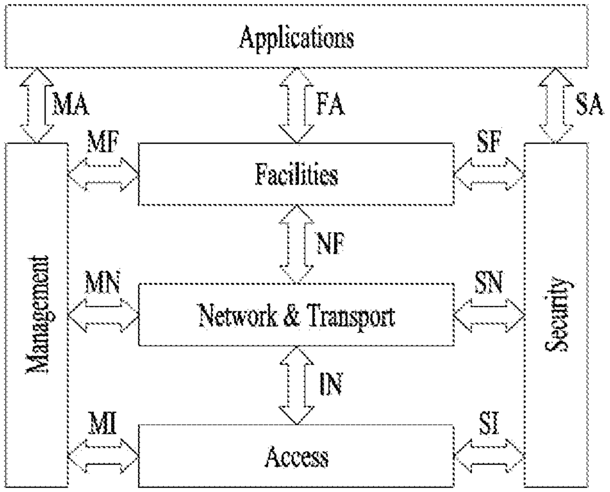
FIG. 10 is a diagram for explaining an ITS station reference architecture.

FIG. 10 is a diagram for explaining an ITS station reference architecture.

The ITS station reference architecture may include an access layer, a network & transport layer, a facilities layer, entities for security and management, and an application layer at the top. Basically, the ITS station reference architecture follows a layered OSI model.

Specifically, features of the ITS station reference architecture based on the OSI model are illustrated in FIG. 9. The access layer of the ITS station corresponds to OSI layer 1 (physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers.

Each layer of the ITS station exchanges data transmitted or received through vehicle communication and additional information for various purposes through an interface. The abbreviations of various interfaces are described below.

MA: Interface between management entity and application layer

MF: Interface between management entity and facilities layer

MN: Interface between management entity and networking & transport layer

MI: Interface between management entity and access layer

FA: Interface between facilities layer and ITS-S applications

NF: Interface between networking & transport layer and facilities layer

IN: Interface between access layer and networking & transport layer

SA: Interface between security entity and ITS-S applications

SF: Interface between security entity and facilities layer

SN: Interface between security entity and networking & transport layer

SI: Interface between security entity and access layer

Figure 11:
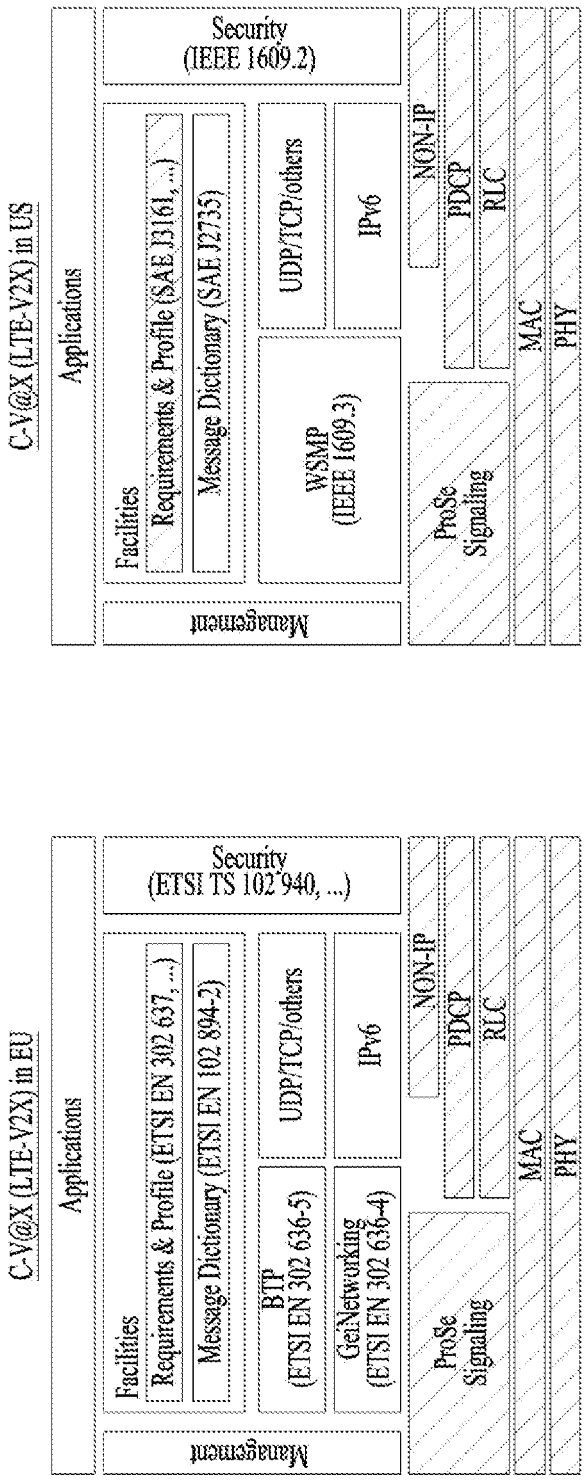
FIG. 11 illustrates an exemplary structure of an ITS station that may be designed and applied based on a reference architecture.

FIG. 11 illustrates an exemplary structure of an ITS station that may be designed and applied based on a reference architecture.

A main concept of the ITS station reference architecture is to allow each layer with a special function to process communication on a layer basis, between two end vehicles/users included in a communication network. That is, when a V2V message is generated, the data is passed through each layer downwards layer by layer in the vehicle and the ITS system (or other ITS-related UEs/systems), and a vehicle or ITS system (or other ITS-related UEs/systems) receiving the message passes the message upwards layer by layer.

The ITS system operating through vehicle communication and the network was organically designed in consideration of various access technologies, network protocols, communication interfaces, etc. to support various use-cases, and the roles and functions of each layer described below may be changed depending on a situation. The main functions of each layer will be briefly described.

The application later actually implements and supports various use-cases. For example, the application layer provides security, efficient traffic information, and other entertainment information.

The application layer controls an ITS station to which an application belongs in various manners or provides services by transferring a service message to an end vehicle/user/infrastructure through the access layer, the network & transport layer, and the facilities layer, which are lower layers of the application layer, by vehicle communication. In this case, the ITS application may support various use-cases. In general, these use-cases may be supported by grouping into other applications such as road-safety, traffic efficiency, local services, and infotainment. Application classification, use-cases, etc. may be updated when a new application scenario is defined. Layer management serves to manage and service information related to operation and security of the application layer, and the related information is transmitted and shared bidirectionally through an MA and an SA (or service access point (SAP), e.g., MA-SAP or SA-SAP). A request from the application layer to the facilities layer or a service message and related information from the facilities layer to the application layer may be delivered through an FA.

The facilities layer serves to support effective implementation of various use-cases defined in an application layer of a higher layer. For example, the facilities layer may perform application support, information support, and session/communication support.

The facilities layer basically supports the 3 higher layers of the OSI model, for example, a session layer, a presentation layer, and the application layer, and functions. Specifically, the facilities layer provides facilities such as application support, information support, and session/communication support, for the ITS. Here, the facilities mean components that provide functionality, information, and data.

The application support facilities support the operation of ITS applications (mainly generation of a message for the ITS, transmission and reception of the message to and from a lower layer, and management of the message). The application support facilities include a cooperative awareness (CA) basic service and a decentralized environmental notification (DEN) basic service. In the future, facilities entities for new services such as cooperative adaptive cruise control (CACC), platooning, a vulnerable roadside user (VRU), and a collective perception service (CPS), and related messages may be additionally defined.

The information support facilities provide common data information or a database to be used by various ITS applications and includes a local dynamic map (LDM).

The session/communication support facilities provide services for communications and session management and include an addressing mode and session support.

Facilities may be divided into common facilities and domain facilities.

The common facilities are facilities that provide common services or functions required for various ITS applications and ITS station operations, such as time management, position management, and service management.

The domain facilities are facilities that provide special services or functions required only for some (one or more) ITS applications, such as a DEN basic service for road hazard warning applications (RHW). The domain facilities are optional functions and are not used unless supported by the ITS station.

Layer management serves to manage and service information related to the operation and security of the facilities layer, and the related information is transmitted and shared bidirectionally through an MF and an SF (or MF-SAP and SF-SAP). The transfer of service messages and related information from the application layer to the facilities layer or from the facilities layer to the application layer is performed through an FA (or FA-SAP), and bidirectional service messages and related information between the facilities layer and the lower networking & transport layer are transmitted by an NF (or NF-SAP).

The network & transport layer servers to configure a network for vehicle communication between homogenous or heterogeneous networks through support of various transport protocols and network protocols. For example, the network & transport layer may provide Internet access, routing, and vehicle networking using Internet protocols such as TCP/UDP+IPv6 and form a vehicle network using a basic transport protocol (BTP) and GeoNetworking-based protocols. In this case, networking using geographic position information may also be supported. A vehicle network layer may be designed or configured depending on technology used for the access layer (access layer technology-independently) or regardless of the technology used for the access layer (access layer technology-independently or access layer technology agnostically).

Functionalities of the European ITS network & transport layer are as follows. Basically, functionalities of the ITS network & transport layer are similar to or identical to those of OSI layer 3 (network layer) and layer 4 (transport layer) and have the following characteristics.

The transport layer is a connection layer that delivers service messages and related information received from higher layers (the session layer, the presentation layer, and the application layer) and lower layers (the network layer, the data link layer, and the physical layer). The transport layer serves to manage data transmitted by an application of the ITS station so that the data accurately arrives at an application process of the ITS station as a destination. Transport protocols that may be considered in European ITS include, for example, TCP and UDP used as legacy Internet protocols as illustrated in FIG. 11, and there are transport protocols only for the ITS, such as the BTS.

The network layer serves to determine a logical address and a packet forwarding method/path and add information such as the logical address of a destination and the forwarding path/method to a header of the network layer in a packet received from the transport layer. As an example of the packet method, unicast, broadcast, and multicast between ITS stations may be considered. Various networking protocols for the ITS may be considered, such as GeoNetworking, IPv6 networking with mobility support, and IPv6 over GeoNetworking. In addition to simple packet transmission, the GeoNetworking protocol may apply various forwarding paths or transmission ranges, such as forwarding using position information about stations including vehicles or forwarding using the number of forwarding hops.

Layer management related to the network & transport layer serves to manage and provide information related to the operation and security of the network & transport layer, and the related information is transmitted and shared bidirectionally through an MN (or MN-SAP) and an SN (or SN-SAP). Transmission of bidirectional service messages and related information between the facilities layer and the networking & transport layer is performed by an NF (or NF-SAP), and service messages and related information between the networking & transport layer and the access layer are exchanged by an IN (or IN-SAP).

A North American ITS network & transport layer supports IPv6 and TCP/UDP to support existing IP data like Europe, and a wave short message protocol (WSMP) is defined as a protocol only for the ITS.

A packet structure of a wave short message (WSM) generated according to the WSMP includes a WSMP header and WSM data carrying a message. The WSMP header includes Version, PSID, WSMP header extension fields, WSM WAVE element ID, and Length.

Version is defined by a WsmpVersion field indicating an actual WSMP version of 4 bits and a reserved field of 4 bits. PSID is a provider service identifier, which is allocated according to an application in a higher layer and helps a receiver to determine an appropriate higher layer. Extension fields is a field for extending the WSMP header, and includes information such as a channel number, a data rate, and transmit power used. WSMP WAVE element ID specifies the type of a WSM to be transmitted. Length specifies the length of transmitted WSM data in octets through a WSMLength field of 12 bits, and the remaining 4 bits are reserved. LLC Header allows IP data and WSMP data to be transmitted separately and is distinguished by Ethertype of a SNAP. The structures of the LLC header and the SNAP header are defined in IEEE802.2. When IP data is transmitted, Ethertype is set to 0x86DD in the LLC header. When WSMP is transmitted, Ethertype is set to 0x88DC in the LLC header. The receiver identifies Ethertype. If Ethertype is 0x86DD, the receiver transmits upward the packet to an IP data path, and if Ethertype is 0x88DC, the receiver transmits upward the packet to a WSMP path.

The access layer serves to transmit a message or data received from a higher layer on a physical channel. As access layer technologies, ITS-G5 vehicle communication technology based on IEEE 802.11p, satellite/broadband wireless mobile communication technology, 2G/3G/4G (long-term evolution (LTE), etc.)/5G wireless cellular communication technology, cellular-V2X vehicle-dedicated communication technologies such as LTE-V2X and NR-V2X (new radio), broadband terrestrial digital broadcasting technology such as DVB-T/T2/ATSC3.0, and GPS technology may be applied.

A data link layer is a layer that converts a physical line between adjacent nodes (or between vehicles) with noise into a communication channel without transmission error, for use in the higher network layer. The data link layer performs a function of transmitting/delivering/forwarding L3 protocols, a framing function of dividing data to be transmitted into packets (or frames) as transmission units and grouping the packets, a flow control function of compensating for a speed difference between a transmitter and a receiver, and a function of (because there is a high probability that an error and noise occurs randomly in view of the nature of a physical transmission medium) detecting a transmission error and correcting the error or detecting a transmission error based on a timer and an ACK signal by a transmitter in a method such as automatic repeat request (ACK) and retransmitting a packet that has not been correctly received. In addition, to avoid confusion between packets or ACK signals, the data link layer performs a function of assigning a sequence number to the packets and the ACK signals, and a function of controlling establishment, maintenance, and disconnection of a data link between network entities, and data transmission between network entities. The main functions of logical link control (LLC), radio resource control (RRC), packet data convergence protocol (PDCP), radio link control (RLC), medium access control (MAC), and multi-channel operation (MCO) included in the data link layer of FIG. 11 will be described below.

An LLC sub-layer enables the use of different lower MAC sub-layer protocols, and thus enables communication regardless of network topology. An RRC sub-layer performs functions such as broadcasting of cell system information required for all UEs within a cell, management of delivery of paging messages, management (setup/maintenance/release) of RRC connection between a UE and an E-UTRAN, mobility management (handover), transmission of UE context between eNodeBs during handover, UE measurement reporting and control therefor, UE capability management, temporary assignment of a cell ID to a UE, security management including key management, and RRC message encryption. A PDCP sub-layer may performs functions such as IP packet header compression in a compression method such as robust header compression (ROHC), cyphering of a control message and user data, data integrity, and data loss prevention during handover. RLC sub-layer delivers a packet received from the higher PDCP layer in an allowed size of the MAC layer through packet segmentation/concatenation, increases data transmission reliability by transmission error and retransmission management, checks the order of received data, reorders data, and checks redundancy. A MAC sub-layer performs functions such as control of the occurrence of collision/contention between nodes for use of shared media among multiple nodes, matching a packet delivered from the higher layer to a physical layer frame format, assignment and identification of the address of the transmitter/receiver, detection of a carrier, collision detection, and detection of obstacles on the physical medium. An MCO sub-layer enables efficient provision of various services on a plurality of frequency channels. The main function of MCO sub-layer is to effectively distribute traffic load of a specific frequency channel to other channels to minimize collision/contention of communication information between vehicles in each frequency channel.

The physical layer is the lowest layer in the ITS layer architecture. The physical layer defines an interface between a node and a transmission medium and performs modulation, coding, and mapping of a transport channel to a physical channel, for bit transmission between data link layer entities and informs the MAC sub-layer of whether a wireless medium is busy or idle by carrier sensing or clear channel assessment (CCA).

A soft V2X system may be a system in which a soft V2X server receives a VRU message or a personal safety message (PSM) from a vulnerable road user (VRU) or a V2X vehicle and transfers information on a neighbor VRU or vehicle based on the VRU message or the PSM message or may analyze a road condition, etc. on which neighbor VRUs or vehicles move and may transmit a message informing a neighbor VRU or vehicle of a collision warning, etc. based on the analyzed information (e.g., through a downlink signal) via V2X communication using a UU interface. Here, the VRU message may be a message transmitted to the soft V2X server through the UU interface, and may include mobility information about the VRU, such as a position, a movement direction, a movement path, and a speed of the VRU. That is, the soft V2X system may use a method of receiving mobility information of VRUs and/or vehicles related to V2X communication through the UU interface and controlling a driving route or a VRU movement flow of the VRU, etc. based on the mobility information received by the softV2X server, such as a network. The soft V2X system may be configured in relation to V2N communication.

User equipment or pedestrian equipment (VRU device) that is difficult to perform direct communication (PC5, DSRC) related to V2X communication can provide or receive driving information and mobility information to nearby vehicles or VRUs through the soft V2X system based on the UU interface. Through this, the user equipment or pedestrian equipment (VRU device) that is difficult to perform the direct communication (PC5, DSRC) can be protected from surrounding vehicles.

Figure 12:
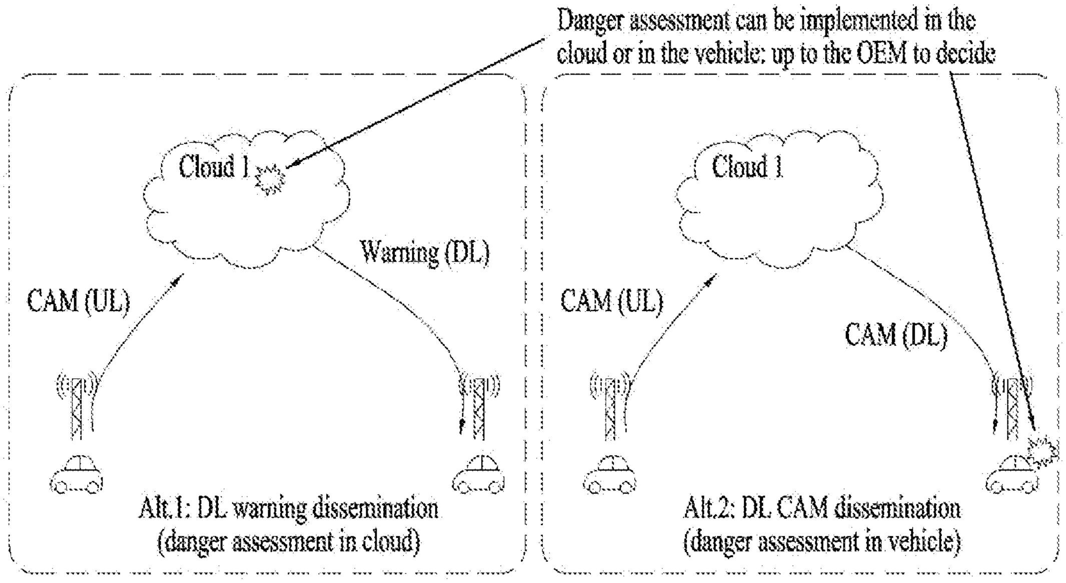
FIG. 12 is a diagram for explaining a method by which a UE calculates or assesses the risk and/or possibility of collision.

Method of Reducing Amount of Computation Required for Collision Assessment at Server FIG. 12 is a diagram for explaining a method by which a UE calculates or assesses the risk and/or possibility of collision.

Referring to FIG. 12, UEs may calculate/assess the risk/probability of collision between the UEs in two different ways based on Uu communication.

Specifically, referring to FIG. 12(*a*), a server/center/BS/cloud may receive information on UEs (e.g., CAM) from the UEs and calculate the risk/possibility of collision between the UEs. Then, based on the calculation results, the server/center/BS/cloud may provide information on the collision risk/possibility between the UEs (e.g., collision warning message) to each UE in DL.

Referring to FIG. 12(*b*), a server/center/BS/cloud may forward to surrounding UEs information on UEs (e.g., CAM) received from the UEs. In this case, each UE may directly calculate/assess the risk/possibility of collision between the UEs based on the information on the UEs, which are located nearby the UE, received from the server/center/cloud.

In FIG. 12(*a*), the assessment/calculation of collision risk/possibility is performed by the server/center/cloud, which has the drawback of increasing the computational and implementation complexity of the server/center/cloud. In contrast, in FIG. 12(*b*), since the server/center/cloud only needs to forward messages received thereby to connected UEs (without processing), the computational/implementation complexity of the server/center/cloud may be reduced. However, in FIG. 12(*b*), since the assessment/calculation of collision risk/possibility needs to be performed by each UE, the scenario related to FIG. 12(*b*) may be applicable only to UEs that have a capability to perform such a role (for example, the calculation/processing capacity of UEs capable of quickly/accurately calculating collision risk/possibility).

In the following, provided are methods of reducing the amount of calculation and computational complexity required for collision assessment on a server in the context of UE communication based on Uu communication. Specifically, provided are operations for reduce the computational complexity of a server/center/cloud and the amount of DL/UL data transmission related thereto on the assumption of the method of FIG. 12(*a*) (first method). In addition, provided are methods of lowering the computational/implementation complexity of a server/center/cloud related to collision assessment by optionally applying the method of FIG. 12(*b*) (second method) when specific conditions are met.

For the sake of clarity in the explanation, the proposed technology will be described based on a scenario where UEs operate based on Uu communication. However, the present disclosure is not limited thereto. In other words, the present disclosure is applicable even when UEs operate based on short-range communication, such as dedicated short-range communication (DSRC) or SL (PC5) communication. For example, the role of the server/center/cloud in FIGS. 12(*a*) and 12(*b*) may be performed by an RSU, and the UE and RSU may perform communication based on SL communication. In this case, transmitting and/or receiving UEs may include vehicles, motorcycles, bicycles, pedestrians, and the like. In addition, the present disclosure will be described on the assumption of unicast communication between a UE and server. The proposed technology may be equally/similarly applicable to messages transmitted and received between arbitrary entities, regardless of the cast type (e.g., unicast, multicast (or groupcast), broadcast, etc.).

As described above, it may be configured that either the first or second method is selectively applied when specific conditions are satisfied. In this case, the computational and implementation complexity related to collision assessment at the server/center/cloud may be reduced. Alternatively, in the scenario according to the second method described above, since the server/center/cloud only needs to forward messages received thereby to connected UEs (without processing), the computational/implementation complexity of the server/center/cloud may be reduced. In this scenario, since the collision assessment needs to be performed by each UE, the scenario according to the second method may be applicable only to UEs that have a capability to perform such a role (for example, the calculation/processing capacity of UEs capable of quickly/accurately calculate collision risk/possibility).

For the sake of convenience in the explanations, a UE with the capability to perform collision assessment (sufficiently well/fast) is defined as a super UE. Depending on whether the UE related to collision assessment is the super UE, three different scenarios, which will be explained below in FIG. 13, may be defined.

While the present disclosure focuses on methods of determining an entity responsible for performing collision assessment based on capability information on the super UE or UE, the content proposed below may be similarly applied not only to methods of performing collision assessment between UEs or determining a subject of processing service information for the collision assessment but also to other services related to driving or safety of the UE. For example, the server/center/cloud may receive capability information from the UE. Then, based on the capability information, the server/center/cloud may determine whether to instruct the UE to perform collision assessment, change, negotiate and/or adjust the movement path of the UE, and/or process/handle service information for safety driving or to directly process/compute the above information. For instance, if UEs are included in vehicles, the server/center/cloud may determine an entity responsible for processing service information to coordinate/negotiate/recommend the route of each vehicle based on the capability information of each of the UEs. In the following, the primary focus will be on describing methods by which the server/center/cloud determines an entity responsible for processing service information related to collision assessment based on the capability information of the UE, for the sake of convenience in the explanation. As described above, the determination of the entity responsible for processing service information is not limited to collision assessment but is applicable to operations of determining an entity responsible for performing all services related to driving including processing/computation of service information related to recommendation and negotiation of the movement path of the UE.

The above UE may include user devices capable of wireless communication such as ITS stations, VRUs, UEs, and so on, which has been described above with reference to FIGS. 10 and 11. Alternatively, the above UE may include vehicles, motorcycles, and/or scooters driving on the road. Further, the UE may be a UE performing V2X communication through the above-described soft V2X server.

Figure 13:
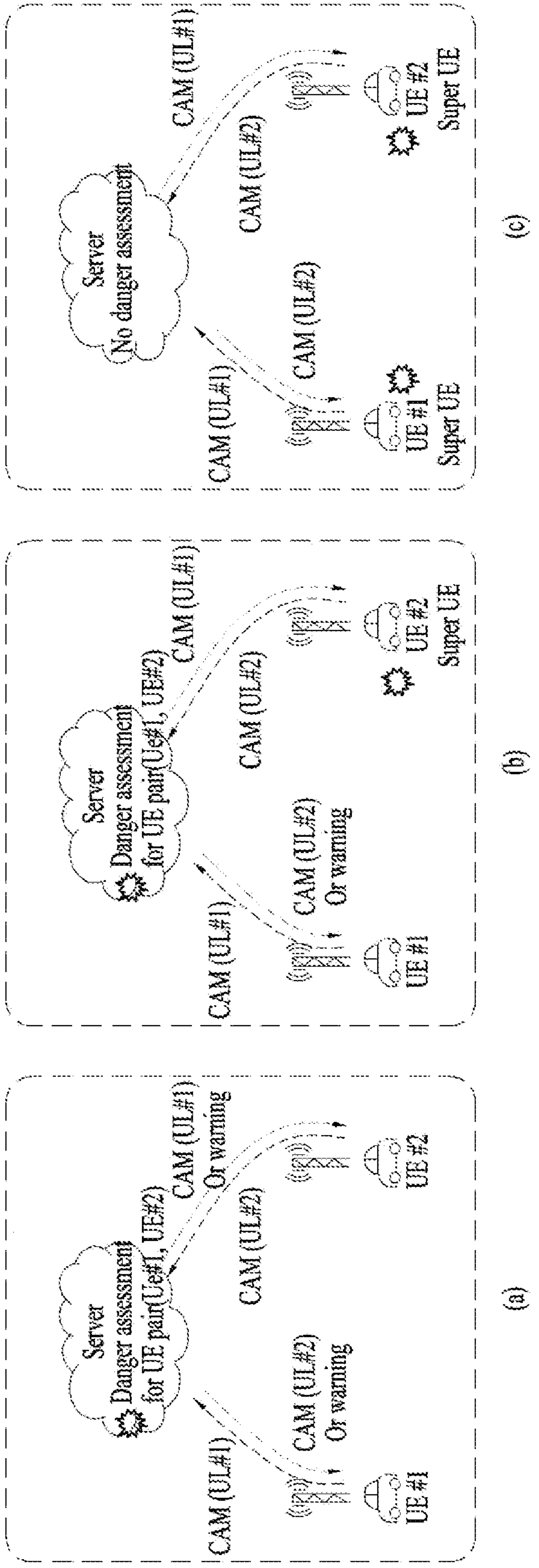
FIG. 13 is a diagram for explaining a method of assessing collision between UEs.

FIG. 13 is a diagram for explaining a method of assessing collision between UEs.

Referring to FIG. 13(*a*), two UEs (UE #1 and UE #2) may not be the super UE (first case). In this scenario, the server may perform collision assessment for the two UEs. Then, based on the collision assessment results for the two UEs, the server may transmit information on a peer UE (e.g., CAM) or a collision warning message to each UE in a DL signal. In this case, it is difficult to reduce the amount of calculation related to collision assessment at the server.

Referring to FIG. 13(*b*), one of two UEs (UE #1 and UE #2) may be the super UE (the second case). For example, among the first UE (UE #1) and the second UE (UE #2), only the second UE (UE #2) may be the super UE. In this scenario, the server may perform collision assessment between the two UEs for the UE that is not the super UE. Then, based on the results, the server may transmit information about the peer UE (e.g., CAM) or a collision warning message to each UEs in DL. In this case, it is also difficult to reduce the amount of calculation related to collision assessment at the server. However, the possibility of reducing DL traffic may vary between a first path (UE #2→Server→UE #1) and a second path (UE #1→Server→UE #2). In other words, the possibility of reducing DL traffic may depend on whether the first UE (UE #1) on the first path or the second UE on the second path (UE #2) is the super UE. For example, in the case of the first path, the server may transmit a warning message to the first UE (UE #1) instead of a CAM from UE #2, thereby reducing the DL traffic (or the size of transmitted data). In contrast, in the case of the second path, the server needs to transmit information on the first UE (e.g., CAM from UE #1) to the second UE (UE #2) in DL to allow the second UE (UE #2) to perform collision assessment, whereby it may be difficult to reduce the DL traffic.

Referring to FIG. 13(*b*), both UEs (UE #1 and UE #2) may be the super UEs (a third case). In this scenario, the server does not need to perform collision assessment and related processing. In other words, the server may forward messages received from the two UEs to instruct each UE to perform collision assessment independently based on the messages received by each UE from the server. In other words, the server may forward a message related to the first UE received from the first UE to the second UE and forward a message related to the second UE received from the second UE to the first UE, without performing the collision assessment and related processing between the first UE and the second UE. In this case, each UE calculates the risk/possibility of collision between UEs, thereby reducing the computational and implementation complexity of the server. To this end, the first and/or second UE may need to perform signaling/operations to inform the server whether the first and/or second UE is the super UE (that is, information on the capability to perform the collision assessment, for example, information on whether the first and/or second UE has the capability to perform the collision assessment (sufficiently well and/or fast enough), the maximum computation/calculation capability for performing the collision assessment, or relevant latency information).

Alternatively, the first and/or second UE may each transmit to the server capability information indicating whether the first and/or second UE is the super UE.

Hereinafter, there are proposed methods for a server to assess/calculate the risk/possibility of collision between an individual UE and a UE group and/or between UE groups without calculating the risk/possibility of collision for each UE pair when the server performs collision assessment between UEs connected to the server. To this end, operations for reducing the computational complexity related to assessment (or collision assessment) at the server may be provided. The proposed methods may reduce the actual number of UE pairs considered in the collision assessment based on UE grouping, thereby reducing the computational complexity related to assessment (or collision assessment) at the server.

Figure 14:
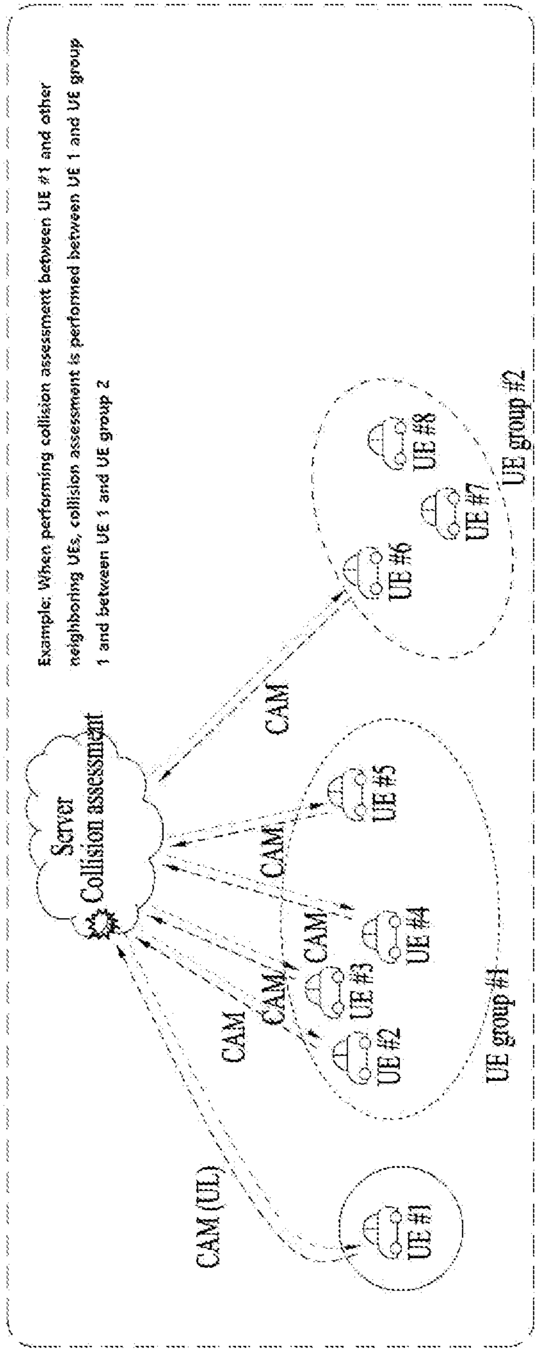
FIG. 14 is a diagram for explaining a collision assessment method based on UE grouping.

FIG. 14 is a diagram for explaining a collision assessment method based on UE grouping.

Referring to FIG. 14, a server may be wirelessly connected to 8 UEs in relation to collision assessment.

According to the prior art, the server may need to perform collision assessment separately for each possible combination of UEs (or UE pairs) (for example, between UE 1 and UE 2, between UE 1 and UE 3, . . . , between UE 1 and UE 8, between UE 2 and UE 1, . . . , and between UE 7 and UE 8) to reduce collision risk between UEs. In contrast, according to the proposed method, the server may perform collision assessment between UE 1 and UE group 1, between UE1 and UE group 2, and between UE group 1 and UE group 2. By forming UE pairs with groups as described above, the computational complexity of the server and the amount of related DL/UL data transmission may be significantly reduced compared to the conventional collision assessment. The proposed operations may be applied as follows. To implement the proposed operations, the server may perform an operation of grouping multiple UEs as follows:

The criteria for UE grouping may include similarity/consistency in the following aspects of UEs: current position, heading direction, speed, acceleration, curvature, path history, driving direction, driving lane, and so on.

In the collision assessment between an individual UE and a UE group, grouped UEs may be regarded as a single large UE. For example, when the server calculates collision risk between vehicles based on the following criteria: size, position, heading direction, and/or speed, the server may assess collision risk with other UEs (not included in the same UE group) or other UE groups based on one representative value for the size/position/heading direction/speed configured for the UE group. Alternatively, at least one UE among UEs grouped into a first UE group may be regarded as a representative UE (or leader UE) of the first UE group. When the collision assessment between the UE group and individual UE is performed, collision assessment may be performed between the representative UE of the UE group and individual UE (not included in the UE group). In this case, the size/position/heading direction/speed of the representative UE may be used/regarded as the representative size/position/heading direction/speed of the corresponding UE group.

For example, the size of an individual UE may be represented by the length/width of the individual UE itself or the length/width of a device (e.g., vehicle, bicycle, motorcycle, etc.) including the individual UE. On the other hand, the size of a UE group may be represented by the shape (e.g., circle/ellipse/square), the length/width/radius from a reference point, and so on.

Alternatively, the location or reference point of the UE group may be the exact center point of an area including the UE group, the position (or reference point) of a specific UE with the highest values for the heading direction, speed, acceleration, and curvature in the UE group, the average position of the reference points of top N UEs in descending order of heading direction/speed/acceleration/curvature values (where N>1), and/or the position of a UE that transmits information on the most and/or latest path points related to the path history. Alternatively, the reference point of the UE group may be the position of a specific UE among UEs in the UE group that is closest to a peer UE where collision assessment is to be performed, the position of a specific UE that had the highest risk of collision in previous collision assessment, or the position of a UE with the most similar movement path in the previous collision assessment. Alternatively, the reference point of the UE group may refer to the position of a UE driving in the lead of the UE group (or UE group formed or grouped based on the same driving direction/lane) on the driving direction/lane.

Alternatively, the heading direction/speed/acceleration/curvature values of the UE group used in the collision assessment may be set to: ① the average, median, maximum and/or minimum value of the heading direction/speed/acceleration/curvature values of some (or all) UEs included in the UE group, ② the heading direction/speed/acceleration/curvature value of a UE that transmitted information on the most and/or latest path points related to the path history to the server, ③ among the UEs in the UE group, the heading direction/speed/acceleration/curvature value of a UE that is closest to a peer UE where collision assessment is to be performed (the heading direction/speed/acceleration/curvature value of a UE having the highest collision risk in the previous collision assessment or the heading direction/speed/acceleration/curvature value of a UE having the most similar movement path), or ④ the heading direction/speed/acceleration curvature values of one/some UEs driving in the lead of the UE group (or UE group formed or grouped based on the same driving direction/lane) based in the driving direction/lane.

In relation to ① above, if the average, median, maximum and/or minimum value of the heading direction/speed/acceleration/curvature values of some (N) UEs are used, the UEs may be N UEs in the UE group that transmitted to the server in descending order of the number of path points related to the path history or in descending order of the most recent path points provided, a UE in the UE group that is closest to a peer UE where collision assessment is to be performed (a UE having the highest collision risk in the previous collision assessment or a UE having the most similar movement path), or N UEs traveling ahead on the driving direction/lane in the UE group (or UE group formed or grouped based on the same driving direction/lane).

If the heading direction/speed/acceleration/curvature value for a first UE group is configured based on ④, an operation of performing collision assessment between the first UE group and UEs not included in the first UE group (or a second UE group) may correspond to an operation of performing collision assessment between the representative UE (or leader UE) of the first UE group and individual UEs not included in the first UE group. Alternatively, if collision assessment is performed between the first UE group and the second UE group, which are different from each other, the collision assessment may correspond to or be interpreted as an operation of performing collision assessment between the representative UE of the first UE group and the representative UE of the second UE group or an operation of performing collision assessment between the representative UE of either the first or second UE group and the other UE group.

For example, when the server performs collision assessment for an individual UE or a UE group (or a representative UE of the UE group), if predetermined conditions are met, the server may transmit assessment information on the collision assessment to the individual UE or the UE group (a peer individual UE or peer individual group where collision with the individual UE is assessed or a peer individual UE or peer individual group where collision with the UE group is assessed) in DL. That is, the server may selectively filter and transmit only the assessment information on the collision assessment that the server needs to transmit among the collision assessments for individual UEs and/or UE groups.

The above operation may include not only an operation in which the server selectively transmits information on an individual UE and/or UE group with actual risk of collision (e.g., CAM from a peer individual UE or peer UE group) to the first UE (UE 1) depending on the results of the collision assessment performed by the server (in terms of the type of data that the server transmits to the UE) but also an operation in which the server transmits information on the first UE (UE 1) (e.g., CAM from UE 1) only to a peer individual UE and/or peer UE group that has actual risk of collision with the first UE (UE 1) in DL (in terms of selection of a destination UE by the server for DL transmission)

For example, when the server performs collision assessment between the first UE (UE 1) and UE group X (representative UE X or UE X), if the server determines that there is high risk of collision between the first UE (UE 1) and UE group X (representative UE X or UE X) (for example, if the collision risk according to the collision assessment is more than or equal to a predetermined specific threshold level), the server may transmit information on UE group X (representative UE X or UE X) to the first UE (UE 1) in DL. On the other hand, if the collision risk is determined to be low (for example, if the collision risk according to the collision assessment is less than or equal to the predetermined specific threshold level), the server may not transmit information on UE group X (representative UE X or UE X) to the first UE (UE 1) in DL.

If the collision risk according to the collision assessment is more than or equal to a specific threshold (th_A) after performing the collision assessment between the first UE (UE 1) and UE group X, the server may transmit a warning message (warning msg) to the first UE (UE 1) and all UEs belonging to UE group X. Alternatively, the server may transmit CAMs from all UEs (or CAMs from other UEs except for the CAMs from UE group X) to the first UE (UE 1) and all UEs included in UE group X. Further, the server may also transmit information on UE group X to the first UE ① in the form of a message created by treating or assuming UEs in UE group X as a single (large) UE (e.g., CAM for UE group X or representative UE (i.e., clustered CAM)) or ② in the form of a message where information on the UEs in UE group X are concatenated/aggregated (e.g., CAM/VAM concatenation/aggregation), without transmitting individual information on all UEs in UE group X (e.g., individual CAMs from all UEs in UE group X).

On the other hand, even when the assessed collision risk is less than the specific threshold (th_A), if the collision risk is more than a predetermined assessment threshold (th_B) (where th_B<th_A), the server may additionally perform collision assessment between the first UE (UE 1) and each of the individual UEs belonging to UE group X. For example, when UE group X includes a second UE (UE 2) and a third UE (UE 3), and when the collision risk (which is calculated between the first UE and UE group X) is calculated to be above the assessment threshold and below the specific threshold, collision risk between the first UE and the second UE and collision risk between the first UE and the third UE may be additionally calculated. In this case, whether to transmit the message (warning message or CAM from peer UEs (or peer UE groups)) may be determined by checking again whether the additionally calculated collision risk is more than or equal to the specific threshold.

Alternatively, the collision assessment between the first UE and UE group X may correspond to collision assessment between the first UE and the representative UE of UE group X, or collision assessment between UE group X and UE group Y may correspond to collision assessment between the representative UE of UE group X and the representative UE (e.g., first UE) of UE group Y. In this case, the above-described operations may be equally applied. For example, grouped UEs may be regarded as a single UE, and a message generated by the single UE may be a clustered message (clustered msg) generated by the representative UE of a UE group consisting of the grouped UEs, which is considered as the cluster leader. Regarding the collision assessment between the first UE and UE group X, while the server may transmit individual information on all UEs in UE group X (e.g., individual CAM from all UEs in UE group X) to the first UE in DL, the server may transmit individual information on the representative UE of the UE group X (e.g., individual CAM from the representative UE) to the first UE in DL.

On the other hand, if all individual UEs included in a UE pair where collision assessment is to be performed are the super UE capable of performing the collision assessment, the server may transmit CAM information on peers to all of the individual UEs in DL, without performing the collision assessment between the UE pair (and without time delay due to the collision assessment at the server). In this case, the UE pair may include at least one of the following: an individual UE and an individual UE, an individual UE and a UE group (or a representative UE of the UE group), a UE group and a UE group (or representative UEs of the UE groups) as described above.

In order to support the operations related to the super UE described above, when the UE is connected to the server, the UE needs to report its collision assessment capability (e.g., whether the UE is the super UE) to the BS. If the UE reports that the corresponding UE is the super UE, the UE may operate by assuming that the UE is supposed to perform collision assessment based on the CAM from a peer UE received from the server in DL.

Alternatively, whether the UE is the super UE and/or whether the server regards/determines the UE as the super UE may be determined in consideration of not only the UE capability to perform collision assessment (e.g., computing power) but also the communication environment and/or driving environment of other UEs. The determination may be made by the UE and/or the server or negotiated through signaling between the UE and the server.

For example, the UE may report to the server whether the UE is the super UE based on at least one of the following conditions. Alternatively, the server may determine whether to regard the UE as the super UE based on at least one of the following conditions.

① When the UE has a capability to perform collision assessment (above a predefined/preconfigured threshold level) (for example, a specific threshold level may be configured in terms of computing power required for the assessment or delay in time required for the assessment, and whether the UE has a capability above the specific threshold level may be defined as the UE capability.)

② When the battery status of the UE is above a predefined/preconfigured threshold level ③ When the UE is in driving mode (or pedestrian/cycling/scooter mode).

④ When the UE is traveling on a specific type of road/environment. For instance, the UE may be traveling on specific types of roads such as a highway, alleyway, sidewalk, or crosswalk, or the UE may be traveling at a speed/acceleration/heading direction exceeding a predetermined threshold in a particular environment.

⑤ When the UE is the representative UE of a UE group to which the UE belongs

To support the above-described operations, at least one of the following reporting items needs to be signaled between the UE and the server.

For example, the UE may report to the server the collision assessment capability, battery status, UE mode (or driving mode), and/or driving road/environment of the UE. Alternatively, the UE may directly determine whether the UE is the super UE based on some/all of the listed information and report the results to the server.

For example, the server may determine whether to perform collision assessment for the UE or instruct the UE to perform the collision assessment. Then, the server may notify the UE of the determination. Alternatively, the server may provide the determination to the UE and suggest that the UE operates based on the determination.

For example, upon receiving the determination/suggestion of the server regarding whether the server will perform the collision assessment or whether the UE will perform collision assessment, the UE may also inform the server whether the UE accepts the determination/suggestion. Alternatively, the UE may transmit to the server a confirmation message indicating that the UE successfully receives a message about the determination/suggestion.

This operation may be interpreted as an operation for determining/negotiating who will perform the collision assessment (e.g., server or super UE). However, the operation may also be interpreted as an operation in which the server determines/negotiates which information (e.g., CAMs from other UE, warning message, etc.) on which UEs the server will transmit to each UE in DL, for the assessment/detection of collision risk between individual UEs.

Referring to FIG. 14, multiple UE groups may be created depending on the road/vehicle driving environment. The server may perform collision assessment for a first UE pair consisting of individual UEs, a second UE pair consisting of an individual UE and a UE group, and/or a third UE pair consisting of UE groups. When the capability of the server (e.g., the number of UE pairs for which the server is capable of simultaneously performing collision assessment, computing power required to perform collision assessment, etc.) reach a limit, when the server needs to select a UE pair for which the server should first (or later) perform collision assessment, and/or when the server needs to select a UE pair for which the server should first perform subsequent operations (e.g., transmission of warning messages, transmission of information about a peer UE between UEs with the risk of collision (e.g., CAM)) after performing collision assessment to adjust the DL traffic volume/size of the server, the server may select a UE pair to perform the collision assessment first by applying at least one of the following criteria or select a UE pair to perform the subsequent operations first based on the assessment results.

First criterion: One or N UE pairs having a distance between UEs belonging to UE pairs (between a UE and a UE group or between UE groups) less than or equal to a (previously) configured specific threshold or one or N UE pairs having the smallest distance between UEs belonging to UE pairs (between a UE and a UE group or between UE groups) among multiple UE pairs where the server needs to perform collision assessment. In this case, the value of N may be determined by the collision assessment capability of the server, and the distance between a UE and a UE group or between UE groups may be calculated based on the reference point for a UE group described above.

Second criterion: One or N UE pairs with the most similar current/past movement path between UEs belonging to UE pairs (between a UE and a UE group or between UE groups)

Third criterion: One or N UE pairs with the most similar heading direction/speed/acceleration/curvature between UEs belonging to UE pairs (between a UE and a UE group or between UE groups)

Fourth criterion: One or N UE pairs including a UE where power saving is essential among UEs belonging to UE pairs Fifth criterion: One or N UE pairs with high risk of collision between UEs belonging to UE pairs (between a UE and a UE group or between UE groups)

Sixth criterion: One or N UE pairs where lane changes are occurring or overtaking is being attempted between UEs belonging to UE pairs (between a UE and a UE group or between UE groups)

Seventh criterion: One or N UE pairs including a UE group with the largest difference in heading direction/speed/acceleration/curvature among UEs belonging to the UE group when UE groups are included in UE pairs For example, as shown in FIG. 14, when the server performs collision assessment between the first UE (UE #1) and UE group 1, between the first UE (UE #1) and UE group 2, and between UE group 1 and UE group 2, if the reference points of UE group 1 and UE group 2 are the second UE (UE #2) and a sixth UE (UE #6), which are representative UEs of the UE groups, and if the server selects a UE pair to perform collision assessment first based on the first criterion, the server may select UE pairs in the following order of priority: first priority (first UE and UE group 1), second priority (UE group 1 and UE group 2), and third priority (first UE and UE group 2).

Figure 15:
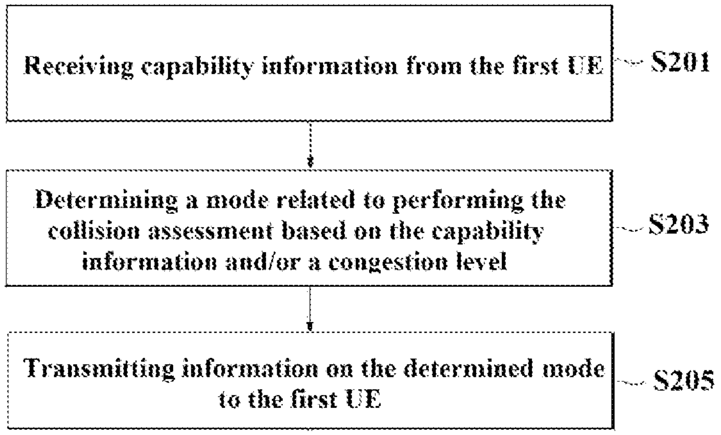
FIG. 15 is a diagram for explaining a method by which a first device performs collision assessment between UEs.

FIG. 15 is a diagram for explaining a method by which a first device performs collision assessment between UEs.

Referring to FIG. 15, the first device may receive capability information on a first UE from the first UE (S301). In this case, the capability information may include information necessary for the first UE to determine whether the first UE needs to directly perform collision assessment for the first UE. For example, the capability information may include the processing capacity of the first UE related to collision assessment, battery status, mobility information (speed, acceleration, heading direction, curvature, etc.), type of road being traveled (highway, crosswalk, alley, sidewalk, etc.), driving mode (driving, pedestrian, bicycle, kickboard, etc.) and so on.

The first UE (or UE) may be an individual UE, a UE group, or a representative UE of the UE group as described above. The collision assessment may be performed between individual UEs, between an individual UE and a UE group, and between UE groups. Each of the individual UEs, the individual UE and the UE group, and the UE groups is defined and described as a UE pair where the collision assessment is performed.

As described above, the first device may be a first server connected to the first UE through the Uu interface and receive the capability information in UL.

The first device may determine or configure the mode for the first UE related to the collision assessment based on the capability information (S201). The mode may include a first mode and a second mode. The first mode may be a mode in which the first device directly performs the collision assessment, and the second mode may be a mode in which the first UE performs the collision assessment. In other words, an entity for performing the collision assessment may vary depending on the mode.

For example, when the processing capacity of the first UE is more than or equal to a predetermined performance threshold or when the battery status of the first UE is more than or equal to a predetermined threshold, the first device may determine or configure the mode for the first UE to the second mode based on the capability information. Alternatively, when the speed of the first UE is more than or equal to a predetermined speed threshold or when the first UE is driving on the highway, the first device may need to rapidly perform the collision assessment based on the capability information, and thus, the first device may determine or configure the mode for the first UE to the first mode. Alternatively, even when the processing capacity of the first UE is more than or equal to the predetermined performance threshold, if there are no issues in the processing performance of the first device (that is, if there is a certain level of margin above the performance limit), the first device may determine the mode for the first UE as the first mode.

Alternatively, the first device may determine the mode for the first UE based on the capability information and the density and/or congestion in an area associated with the first UE (S203). For example, even if the processing capacity of the first UE is more than or equal to the predetermined performance threshold, the first device may configure or determine the mode for the first UE to be the first mode rather than the second mode based on the density or congestion in the area associated with the first UE. In other words, if the area associated with the first UE has a congestion level (or UE density) more than or equal to a specific threshold, it may be difficult for the first UE to perform the collision assessment by receiving a significant number of messages from neighboring UEs. Thus, the first device may determine the mode for the first UE as the first mode. In contrast, in the case of collision assessment for an area with high UE density, when the processing capacity of the first device reaches a limit, the first device may determine the mode for the first UE as the second mode if the processing capacity of the first UE is more than or equal to the predetermined performance threshold. Alternatively, the predetermined performance threshold may vary depending on the UE density (or congestion level). For example, the predetermined performance threshold may be configured to decrease as the UE density increases. This is because as the UE density increases, the load on the processing capacity of the first device may increase significantly. Further, the first UE may further include information on a CBR or CR measured in relation to the UE density in the capability information to be transmitted to the first device.

Next, the first device may transmit mode information determined for the first UE to the first UE (S205). In this case, the mode information may be transmitted to the first UE in DL. The mode information may include indication information indicating one of the first mode and the second mode. Even if the first device does not transmit the mode information to the first UE, the first UE may operate by assuming that among the first and second modes, a mode related to the capability information will be configured based on reporting of the capability information.

Alternatively, the first device may receive first UE information from the first UE and receive second UE information from a second UE for which collision assessment with the first UE is required. The first device may perform the collision assessment for the first UE and the second UE (or a UE pair) based on the first UE information and the second UE information. The first device may transmit a collision warning message if there is risk of collision (first mode), or the first device may forward the second UE information to the first UE (second mode). For example, if the mode for the first UE is the first mode, the first device may directly perform the collision assessment between the first UE and the second UE. Depending on the results, the first device may transmit the collision warning message to the first UE other than the second UE information. In contrast, if the mode for the first UE is the second mode, the first device may directly perform the collision assessment between the first UE and the second UE. Depending on the results, the first device may transmit the collision warning message to the first UE other than the first UE information. The mode for the second UE may be configured based on capability information on the second UE, and the first UE information or the collision warning message may be transmitted depending on the mode configured for the second UE, regardless of the mode configured for the first UE.

In this case, the second UE may be an individual UE, a UE group, or a representative UE of the UE group as described above. A UE group is obtained by grouping a plurality of UEs based on the heading direction, speed, acceleration, curvature, path history, driving lane, and driving direction of each UE. That is, the first device may group a plurality of UEs into at least one UE group based on the heading direction, speed, acceleration, curvature, path history, driving lane, and driving direction of each UE. In addition, the first device may determine the representative UE of the UE group. The representative UE may be a UE driving in the lead in the driving direction or driving lane among UEs included in a first UE group, a UE closest to the first UE, or a UE with the most similar path history to the first UE. The representative UE may be determined by the first device and notified to the second UE, or the representative UE may be directly determined by the second UE and notified or reported to the first device. Alternatively, the second UE information may include information on the individual UE or group information on the UE group. For example, the second UE information, which is the group information, may be a clustered CAM for the UE group or information obtained by aggregating information on UEs in the UE group.

Alternatively, the first device may determine at least one UE pair to transmit a message in DL among a plurality of UE pairs where collision assessment is performed. For example, the first device may perform collision assessment for each UE pair to calculate collision risk and transmit a message only to UE pairs having collision risk more than or equal to a predetermined risk threshold among the plurality of UE pairs. In this case, as described above, the message may include UE information on a peer UE for each UE included in the UE pair, or the message may include information notifying the collision risk. For example, the first device may determine the mode for the first UE as the first mode and perform collision assessment between the first UE and the second UE. In this case, the first device may provide a collision warning message (or information on the second UE) to the first UE only if the collision risk according to the collision assessment is higher than or equal to the predetermined risk threshold.

As described above, in the case of the collision assessment for each of the UE pairs, if the processing capacity of the first device reaches a specific limit and/or if the amount of DL data needs to be adjusted, the first device may configure or determine priorities between the plurality of UE pairs for the collision assessment and/or DL transmission. Then, the first device may perform the collision assessment for the UE pairs and/or transmit related messages based on the priorities. In this case, the priorities may be determined based on at least one of the distance between two UEs included in each UE pair (between an individual UE and a UE group or between UE groups), battery statuses, similarity in path histories, heading directions or speeds, and driving conditions. For example, the closer the distance between the two UEs of each UE pair, the more similar the path history, the more similar the heading directions or speeds, and/or the more similar the driving conditions, the higher the priority may be determined.

The first device may correspond to a first server or a soft V2X server for performing soft V2X communication. In this case, the first device may receive the capability information in a UL signal and transmit information on the determined mode or information on other UEs (e.g., CAMs) in a DL signal.

Figure 16:
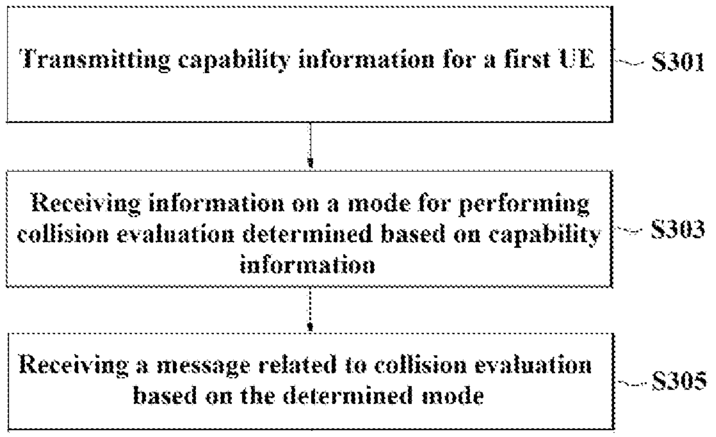
FIG. 16 is a diagram for explaining a method by which a first UE is configured with a mode related to collision assessment.

FIG. 16 is a diagram for explaining a method by which a first UE is configured with a mode related to collision assessment.

Referring to FIG. 16, the first UE may transmit capability information related to the collision assessment to a first device (hereinafter referred to as a first server) in UL (S301). The capability information may include information for determining whether the first UE is capable of directly performing the collision assessment as described above with reference to FIGS. 12 to 15.

The first UE may be configured with a mode from the first server in a DL signal (S303). As described above, either a first mode or a second modes is set to the mode based on the capability information. In this case, the first mode may be a mode in which the first server directly performs the collision assessment, and the second mode may be a mode in which the first UE directly performs the collision assessment. However, even if the first UE reports through the capability information that the first UE has sufficient processing capacity to directly perform the collision assessment, the first UE may have the first mode configured. For example, when the first server determines, based on its available processing capacity, road conditions, or driving speeds, that it is advantageous for the first server to perform the collision assessment quickly and accurately compared to the first UE, even if the first UE reports the capability information indicating that the first UE is capable of directly performing the collision assessment, the mode for the first UE may be set to the first mode.

The first UE may receive a message related to the collision assessment based on the mode (S305). Specifically, if the mode is the first mode, the first UE may receive a collision warning message as the message related to the collision assessment. In this case, the first UE may receive the collision warning message from the first server only when the collision risk according to the collision assessment is high, instead of receiving a message (CAM) including information about neighboring UEs from the first server every time as in the prior art. On the contrary, if the mode is the second mode, the first UE may receive information on a second UE in the message, where the second UE corresponds to a peer UE for the collision assessment. In this case, the first UE may perform the collision assessment therefor based on the received UE information. On the other hand, when the mode is the first mode, if the collision risk between the first UE and other UEs is low, the first server may drop the transmission of the message or transmit UE information (e.g., CAMs) on the other UEs to the first UE as in the prior art.

The present disclosure has been described with a focus on the methods of determining an entity responsible for performing collision assessment based on capability information on a super UE or UE. The determination of an entity responsible for processing service information described in the present disclosure is not limited to collision assessment only but is also applicable to operations of determining an entity responsible for performing all services related to driving such as processing/computation of service information related to recommendation and/or negotiation of the movement path of a UE. For example, the method by which a first device processes service information related to services provided to a first UE involves receiving capability information from the first UE and determining an entity responsible for processing the service information based on the capability information. If the service information is to be processed by the first device, a first mode may be determined, and if the service information is to be processed by the first UE, a second mode may be determined. The first device may transmit information on the mode determined based on the capability information to the first UE, thereby informing the first UE of the entity responsible for processing the service information. The first device may perform operations for processing the service information based on the determination of the first mode and provide information about the processing results to the first UE. The processing results may include information on the results of collision assessment between the first UE and other UEs based on processing of the service information and information on a change in the movement path, which is made by the agreement, adjustment, modification, or harmonization of the movement path between the first UE and other UEs.

It is obvious that each of the examples of the proposed methods may also be included as one implementation method of the present disclosure, and thus each example may be regarded as a kind of proposed method. The present disclosure is not limited to UL or DL communication. In other words, the present disclosure may also be used in direct communication between UEs, and in this case, the proposed methods may be used by a BS, a relay node, and so on. Herein, the term "UE" means a user terminal, but a network equipment such as a BS may also be regarded as a kind of UE if the network equipment transmits and receives signals according to UE-to-UE communication schemes. In addition, it may be regulated that information on whether the proposed methods are applied (or information on rules related to the proposed methods) is transmitted from a BS to a UE or from a transmitting UE to a receiving UE in a predefined signal (e.g., physical layer signaling or higher layer signaling). Various embodiments of the present disclosure may be combined with each other.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 17:
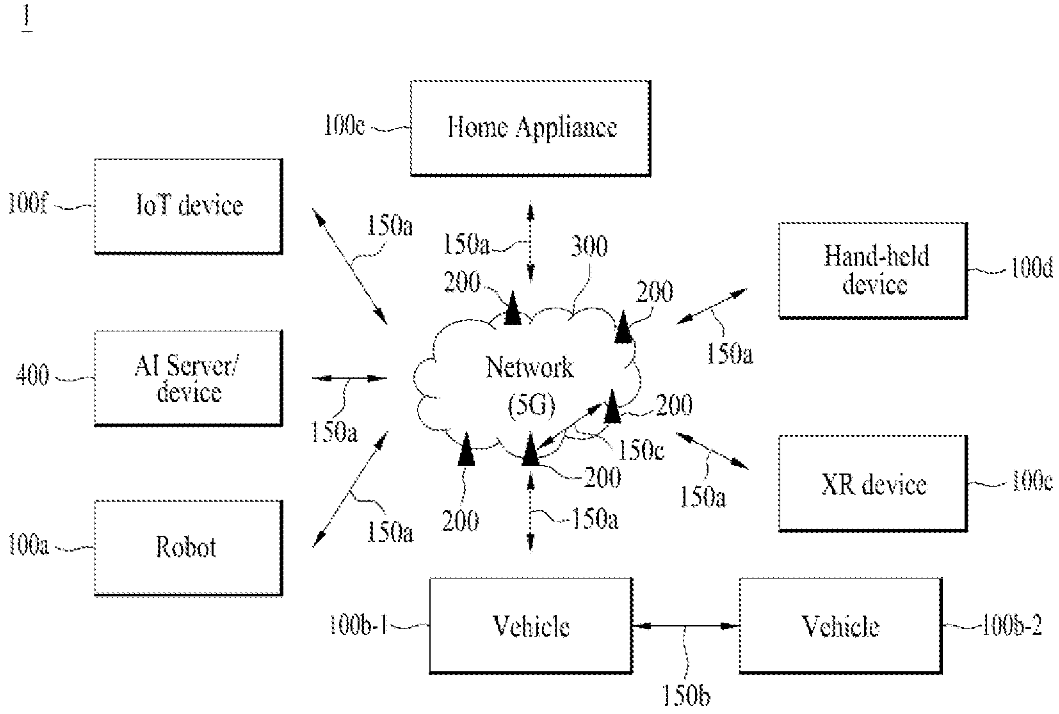
FIG. 17 illustrates a communication system applied to the present disclosure.

FIG. 17 illustrates a communication system applied to the present disclosure.

Referring to FIG. 17, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 18:
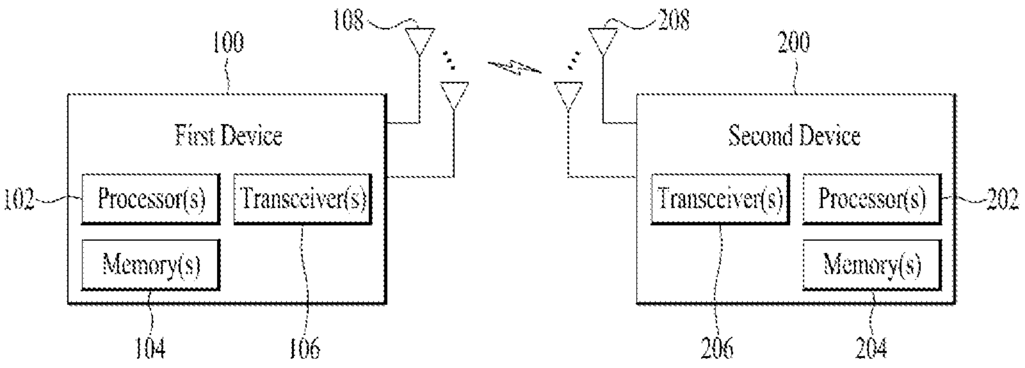
FIG. 18 illustrates wireless devices applicable to the present disclosure.

FIG. 18 illustrates a wireless device applicable to the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The first wireless device 100 may correspond to a first device or server. The first device may include the processor(s) 102 connected to the RF transceiver(s) 106 and the memory(s) 104. The memory(s) 104 may include at least one program for performing operations related to the embodiments described in FIGS. 12 to 16.

Specifically, the processor(s) 102 may control the RF transceiver(s) 106 to receive capability information from a first UE; determine one mode from among a first mode and a second mode based on the capability information; and control the RF transceiver(s) 106 to transmit information on the one mode to the first UE. Whether to perform collision assessment for the first UE may be determined based on the one mode. The processor(s) 102 may perform the operations described in FIGS. 12 to 16 based on the program included in the memory(s) 104.

Alternatively, a chipset including the processor(s) 102 and the memory(s) 104 may be configured. The chipset may include: at least one processor; and at least one memory operably connected to the at least one processor and configured to, when executed, cause the at least one processor to perform operations. The operations may include: receiving capability information from a first UE; determining one mode from among a first mode and a second mode based on the capability information; and transmitting information on the one mode to the first UE. Whether to perform collision assessment for the first UE may be determined based on the one mode. The operations may include the operations described in FIGS. 12 to 16 based on the program included in the memory(s) 104.

Alternatively, a computer-readable storage medium including at least one computer program that causes the processor(s) 102 to perform operations may be provided. The operations may include: receiving capability information from a first UE; determining one mode from among a first mode and a second mode based on the capability information; and transmitting information on the one mode to the first UE. Whether to perform collision assessment for the first UE may be determined based on the one mode. The operations may include the operations described in FIGS. 12 to 16 based on the program included in the memory(s) 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The second wireless device 200 may correspond to a first UE. The server may include the RF transceiver(s) 206, the processor(s) 202, and the memory(s) 204. The memory(s) 204 may include at least one program for performing operations related to the embodiments described in FIGS. 12 to 16.

Specifically, the processor(s) 102 may control the RF transceiver(s) 206 to: transmit capability information to a first server in a UL signal; receive a configuration of one mode related to collision assessment in a DL signal; and receive a message related to the collision assessment in downlink based on the one mode. The one mode may be configured from among a first mode and a second mode based on the capability information. Whether to perform the collision assessment may be determined based on the configured mode. The processor(s) 202 may perform the operations described in FIGS. 12 to 16 based on the program included in the memory(s) 204.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 19:
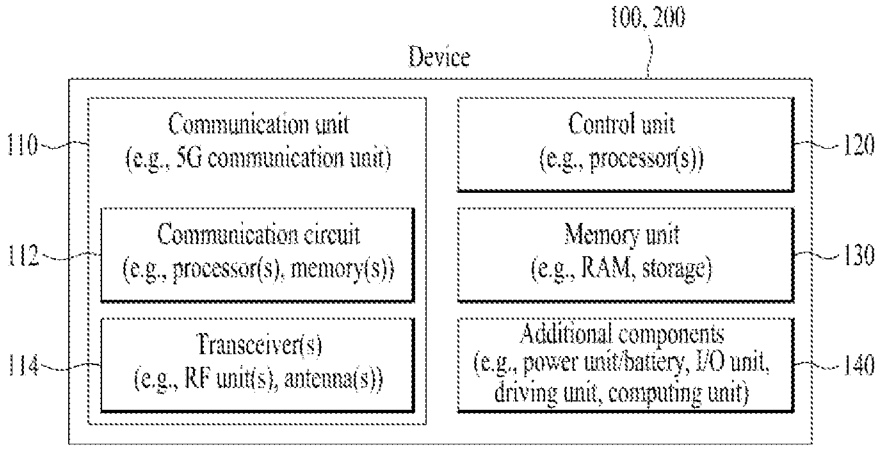
FIG. 19 illustrates another example of a wireless device to which the present disclosure is applied.

FIG. 19 illustrates another example of a wireless device applied to the present disclosure. The wireless device may be implemented in various forms according to a use-case/service (refer to FIG. 20).

Referring to FIG. 19, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 17), the vehicles (100*b*-1 and 100*b*-2 of FIG. 17), the XR device (100*c* of FIG. 17), the hand-held device (100*d* of FIG. 17), the home appliance (100*e* of FIG. 17), the IoT device (100*f* of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 20:
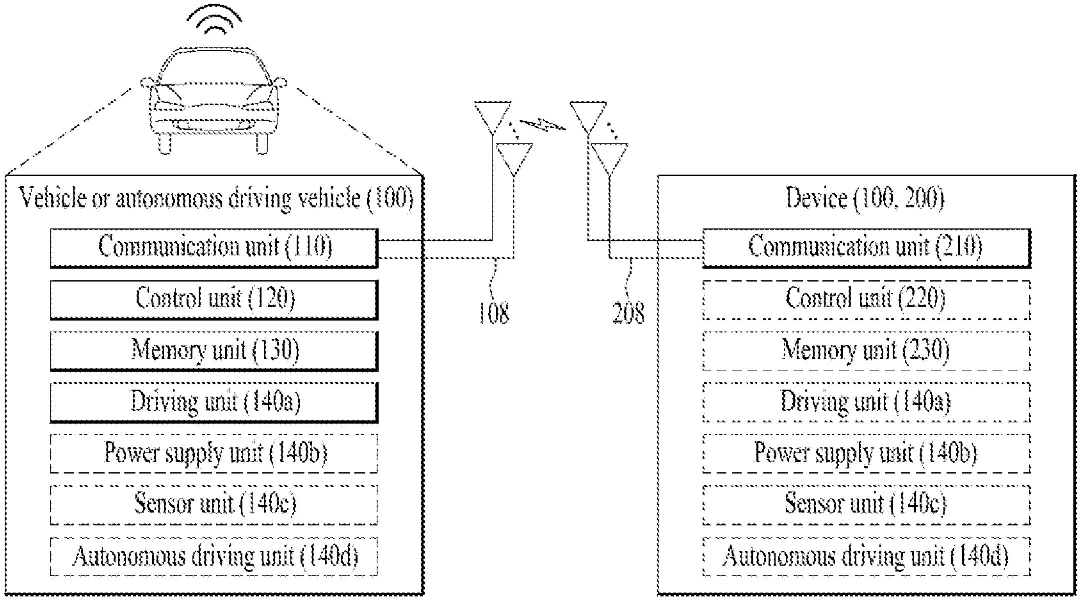
FIG. 20 illustrates a vehicle or an autonomous driving vehicle applied to the present disclosure.

Examples of Vehicles or Autonomous Vehicles to which the Present Disclosure is Applied FIG. 20 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 20, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140$b$ may supply power to the vehicle or the autonomous driving vehicle 100 and include a wired/wireless charging circuit, a battery, etc. The sensor unit 140$c$ may acquire a vehicle state, ambient environment information, user information, etc. The sensor unit 140$c$ may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140$d$ may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140$d$ may generate an autonomous driving path and a driving plan from the acquired data. The control unit 120 may control the driving unit 140$a$ such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140$c$ may obtain a vehicle state and/or surrounding environment information. The autonomous driving unit 140$d$ may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure.

INDUSTRIAL APPLICABILITY

The above-described embodiments of the present disclosure are applicable to various mobile communication systems.

The invention claimed is:

1. A method by a first device comprising:

receiving capability information from a first user equipment (UE), wherein the capability information includes a processing capability of the first UE and a channel busy ratio (CBR) related to a communication environment between neighboring UEs;

determining one mode from among a first mode and a second mode related to execution of a collision assessment based on the processing capability of the first UE and a specific threshold; and transmitting information on the one mode to the first UE, wherein, based on the processing capability of the first UE being less than the specific threshold, the one mode is determined as the first mode in which the collision assessment for the first UE is performed by the first device, and wherein the specific threshold is determined based on the CBR.

2. The method of claim 1, wherein, based on the processing capability of the first UE being greater than or equal to the specific threshold, the one mode is determined as the second mode, and wherein the collision assessment for the first UE is not performed by the first device based on the one mode being determined as the second mode.

3. The method of claim 2, further comprising: transmitting UE information on a second UE for collision assessment between the first UE and the second UE or a collision warning message regarding collision with the second UE based on the one mode.

4. The method of claim 3, wherein the first device transmits the UE information to the first UE based on that the one mode is determined as the second mode, and wherein the first device transmits the collision warning message to the first UE rather than the UE information based on that the one mode is determined as the first mode.

5. The method of claim 3, wherein the second UE is included in a first UE group or is a representative UE of the first UE group.

6. The method of claim 5, wherein the first UE group is grouped based on speeds, acceleration values, curvature values, path histories, driving lanes, and driving directions of UEs.

7. The method of claim 5, wherein the representative UE is a UE driving in a lead among UEs included in the first UE group based on a driving direction or a driving lane, a UE closest to the first UE, or a UE with a most similar path history to the first UE.

8. The method of claim 1, wherein the capability information further includes information on at least one of a battery status, a driving condition, a road type, or a UE mode of the first UE.

9. The method of claim 1, further comprising:

performing collision assessment between the first UE and a second UE based on that the one mode is determined as the first mode; and determining whether to transmit UE information on the second UE to the first UE in downlink based on the collision assessment.

10. The method of claim 1, further comprising, based on that the processing capability of the first device reaches a specific limit or that an amount of downlink data needs to be adjusted in collision assessment for each UE pair including two UEs, determining priorities between the UE pairs related to the collision assessment or transmission of the downlink data.

11. The method of claim 10, wherein the priorities are determined based on at least one of a distance between the two UEs, battery statuses of the two UEs, similarity in path histories between the two UEs, heading directions or speeds of the two UEs, or driving conditions of the two UEs.

12. A method of receiving, by a first user equipment (UE) comprising:

transmitting capability information to a first server in an uplink signal, wherein the capability information includes a processing capability of the first UE and a channel busy ratio (CBR) related to a communication environment between neighboring UEs;

receiving a configuration of one mode related to a collision assessment in a downlink signal; and receiving a message related to the collision assessment in downlink based on the one mode, wherein the one mode is configured from among a first mode and a second mode based on the processing capability of the first UE and a specific threshold, wherein, based on the processing capability of the first UE being less than the specific threshold, the one mode is configured as the first mode in which the collision assessment for the first UE is performed by the first server, and wherein the specific threshold is determined based on the CBR.

13. A first device comprising:

a radio frequency (RF) transceiver; and a processor connected to the RF transceiver, wherein the processor is configured to:

control the RF transceiver to receive capability information from a first user equipment (UE), wherein the capability information includes a processing capability of the first UE and a channel busy ratio (CBR) related to a communication environment between neighboring UEs;

determine one mode from among a first mode and a second mode related to execution of a collision assessment based on the processing capability of the first UE and a specific threshold; and control the RF transceiver to transmit information on the one mode to the first UE, wherein, based on the processing capability of the first UE being less than the specific threshold, the one mode is determined as the first mode in which the collision assessment for the first UE is performed by the first device, and wherein the specific threshold is determined based on the CBR.

* * * * *